(12) United States Patent
Koga

(10) Patent No.: US 7,996,605 B2
(45) Date of Patent: Aug. 9, 2011

(54) STORAGE CONTROLLER AND METHOD FOR CONTROLLING THE SAME

(75) Inventor: Tsutomu Koga, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 774 days.

(21) Appl. No.: 12/010,847

(22) Filed: Jan. 30, 2008

(65) Prior Publication Data

US 2009/0031150 A1    Jan. 29, 2009

(30) Foreign Application Priority Data

Jul. 24, 2007   (JP) .................................. 2007-191795

(51) Int. Cl.
*G06F 12/00* (2006.01)
(52) U.S. Cl. .. 711/112; 711/156; 711/105; 711/E12.016
(58) Field of Classification Search .................... None
See application file for complete search history.

(56) References Cited

U.S. PATENT DOCUMENTS

| | | | | |
|---|---|---|---|---|
| 4,914,656 A | * | 4/1990 | Dunphy et al. | 714/710 |
| 7,821,864 B2 | * | 10/2010 | Totolos et al. | 365/227 |
| 2004/0054939 A1 | | 3/2004 | Guha et al. | |

OTHER PUBLICATIONS

Dennis Colarelli et al., "The Case for Massive Arrays of Dile Disks (MAID)", Jan. 7, 2002, USENIX, http://www.usenix.org/publication/library/proceedings/fast02/wips/colarelli.pdf.

* cited by examiner

*Primary Examiner* — Reginald G Bragdon
*Assistant Examiner* — Thanh D Vo
(74) *Attorney, Agent, or Firm* — Volpe and Koenig, P.C.

(57) ABSTRACT

A storage controller and a method for controlling a storage controller, including a plurality of nonvolatile memory modules having a plurality of nonvolatile memory chips for storing data from a host computer and a nonvolatile memory control unit for controlling data input to and output from the host computer by controlling a power source for the nonvolatile memory modules. The nonvolatile memory control unit, when reading or writing data from or to a designated nonvolatile memory module at a specified time in response to a data read/write request from the host computer, controls the power source for only the designated nonvolatile memory module to be turned on that can maintain its performance and reduce power consumption and thereby realize large capacity and low power consumption.

9 Claims, 25 Drawing Sheets

FIG.7

| DATA ADDRESS | CM | HDD |
|---|---|---|
| 0x0000 | ○ | ○ |
| ⋮ | ⋮ | ⋮ |
| 0x000M | ○ | ○ |
| ⋮ | ⋮ | ⋮ |
| 0x000N | ○ | ○ |

| DATA ADDRESS | LU NUMBER | LU-ECCG | FM MODULE NUMBER | FM-ECCG |
|---|---|---|---|---|
| 0x0000 | 1 | 1, 2 | a | 1, 2 |
| ⋮ | ⋮ | ⋮ | ⋮ | ⋮ |
| 0x000M | m | x, x+1 | b | x, x+1 |
| ⋮ | ⋮ | ⋮ | ⋮ | ⋮ |
| 0x000N | n | y, y+1 | c | y, y+1 |

| CTL NAME | FM MODULE NUMBER |
|---|---|
| N (N≧0) | 8N |
| | 8N+1 |
| | 8N+2 |
| | ... |
| | 8N+7 |

| DATA ADDRESS | LU NUMBER | LU-ECCG | FM MODULE NUMBER | FM-ECCG |
|---|---|---|---|---|
| 0x0000 | 1 | 1, 2 | a | 1, 2 |
| ⋮ | ⋮ | ⋮ | ⋮ | ⋮ |
| 0x000M | m | x, x+1 | b | x, x+1 |
| ⋮ | ⋮ | ⋮ | ⋮ | ⋮ |
| 0x000N | n | y, y+1 | c | y, y+1 |

STORAGE CONTROLLER AND METHOD FOR CONTROLLING THE SAME

CROSS-REFERENCE TO RELATED APPLICATIONS

This application relates to and claims priority from Japanese Patent Application No. 2007-191795, filed on Jul. 24, 2007, the entire disclosure of which is incorporated herein by reference.

BACKGROUND

1. Field of the Invention

The present invention relates to a storage controller and a method for controlling the storage controller. In particular, the invention is suited for application in a storage controller in which flash memory is employed as a storage device.

2. Description of Related Art

Conventionally, semiconductor memory and hard disk drives have been used as storage devices in storage controllers. Semiconductor memory has the advantages of fast access speed, small size, low power consumption, and high reliability; however, at the same time, semiconductor memory has the drawback of being much more expensive per bit-unit compared with the cost of hard disk drives. On the other hand, hard disk drives have the drawbacks of slower access speeds, larger size, higher power consumption, and lower reliability than semiconductor memory, while at the same time having the advantage of being much less expensive per bit-unit compared with the cost of semiconductor memory.

Therefore, hard disk drives have been considered as the mainstream for storage devices in storage systems in recent years. With this trend, technical innovation after technical innovation relating to hard disk drives has been made, and the storage capacity per unit area of a hard disk drive has been improved drastically.

Also, reliability, which is a weakness of hard disk drives, has been improved by means of the application of RAID (Redundant Array of Inexpensive/Independent Disks) technology.

However, in recent years, flash memory that is semiconductor memory capable of freely rewriting data and avoiding loss of data even if the power source is turned off, has been widely used in storage devices. The power-on-and-off speed of such flash memory is several tens of microseconds, which is much faster than that of hard disk drives. With the widespread use of the flash memory, its cost per bit-unit has also been reduced.

In order to realize a storage system with low power consumption by utilizing flash memory having the above-described characteristics in a storage system, techniques relating to MAID (Massive Array of Idle Disks) are disclosed in the US Patent Application No. 2004/0054939 A1 and in an online article entitled "The Case for Massive Arrays of Idle Disks (MAID)" by Dennis Colarelli, Dirk Grunwald, and Michael Neufeld, dated Jan. 7, 2002, USENIX (U.S.) [found on Aug. 5, 2005 on the Internet] [URL: http://www.usenix.org/publications/library/proceedings/fast02/wips/colarelli.pdf]

However, the techniques described in the above-mentioned patent application and online article have the problem of being incapable of maintaining both low power consumption and high performance, because there is a limitation on where the MAID techniques can be applied in a storage system.

Flash memory is guaranteed only for about one hundred thousand writes. As a result, if the flash memory is utilized as a storage device in a storage system, it is necessary to take the characteristics of the flash memory into account.

SUMMARY

The present invention was devised in light of the above circumstances. It is an object of the invention to suggest a storage controller that can maintain its performance and reduce power consumption and thereby realize large capacity and low power consumption; and a method for controlling such a storage controller.

In order to achieve the above-described object, a storage controller connected to a host computer is provided according to an aspect of the invention wherein the storage controller includes: a plurality of nonvolatile memory modules having a plurality of nonvolatile memory chips for storing data from the host computer; and a nonvolatile memory control unit for controlling data input to and output from the host computer by controlling a power source for the nonvolatile memory modules; wherein when reading or writing data from or to a designated nonvolatile memory module at a specified time in response to a data read/write request from the host computer, the nonvolatile memory control unit performs power-on control to turn on the power source for only the designated nonvolatile memory module.

As a result, power-off control is performed to have the power source for the nonvolatile memory modules normally off, and power-on control is performed only when necessary to turn on the power source for the designated nonvolatile memory module. Accordingly, it is possible to maintain the performance of the flash memory and reduce the power consumption of the entire storage system.

Also, a method for controlling a storage controller connected to a host computer is provided according to another aspect of the invention, wherein the storage controller includes: a plurality of nonvolatile memory modules having a plurality of nonvolatile memory chips for storing data from the host computer; and a nonvolatile memory control unit for controlling data input to and output from the host computer by controlling a power source for the nonvolatile memory modules; wherein the storage controller controlling method includes the step executed by the nonvolatile memory control unit of performing power-on control to turn on the power source only for the designated nonvolatile memory module when reading or writing data from or to a designated nonvolatile memory module at a specified time in response to a data read/write request from the host computer.

As a result, power-off control is performed to have the power source for the nonvolatile memory modules normally off, and power-on control is performed only when necessary to turn on the power source for the designated nonvolatile memory module. Accordingly, it is possible to maintain the performance of the flash memory and reduce the power consumption of the entire storage system.

The present invention enables power control to turn on the power source for flash memory only when necessary by using a storage system equipped with nonvolatile-medium flash memory whose power-on-and-off speed is fast. In this way, a storage system with large capacity and low power consumption can be realized.

Other aspects and advantages of the invention will be apparent from the following description and the appended claims.

BRIEF DESCRIPTION OF THE DRAWINGS

FIG. 7 is a chart showing a position management table according to the first embodiment.

FIG. 8 is a chart showing an address conversion table according to the first embodiment.

FIG. 9 is a chart showing a module management table according to the first embodiment.

FIG. 23 is a management screen to which the address conversion table is output when a failure has occurred in the flash memory module according to the first embodiment.

Figure 1:
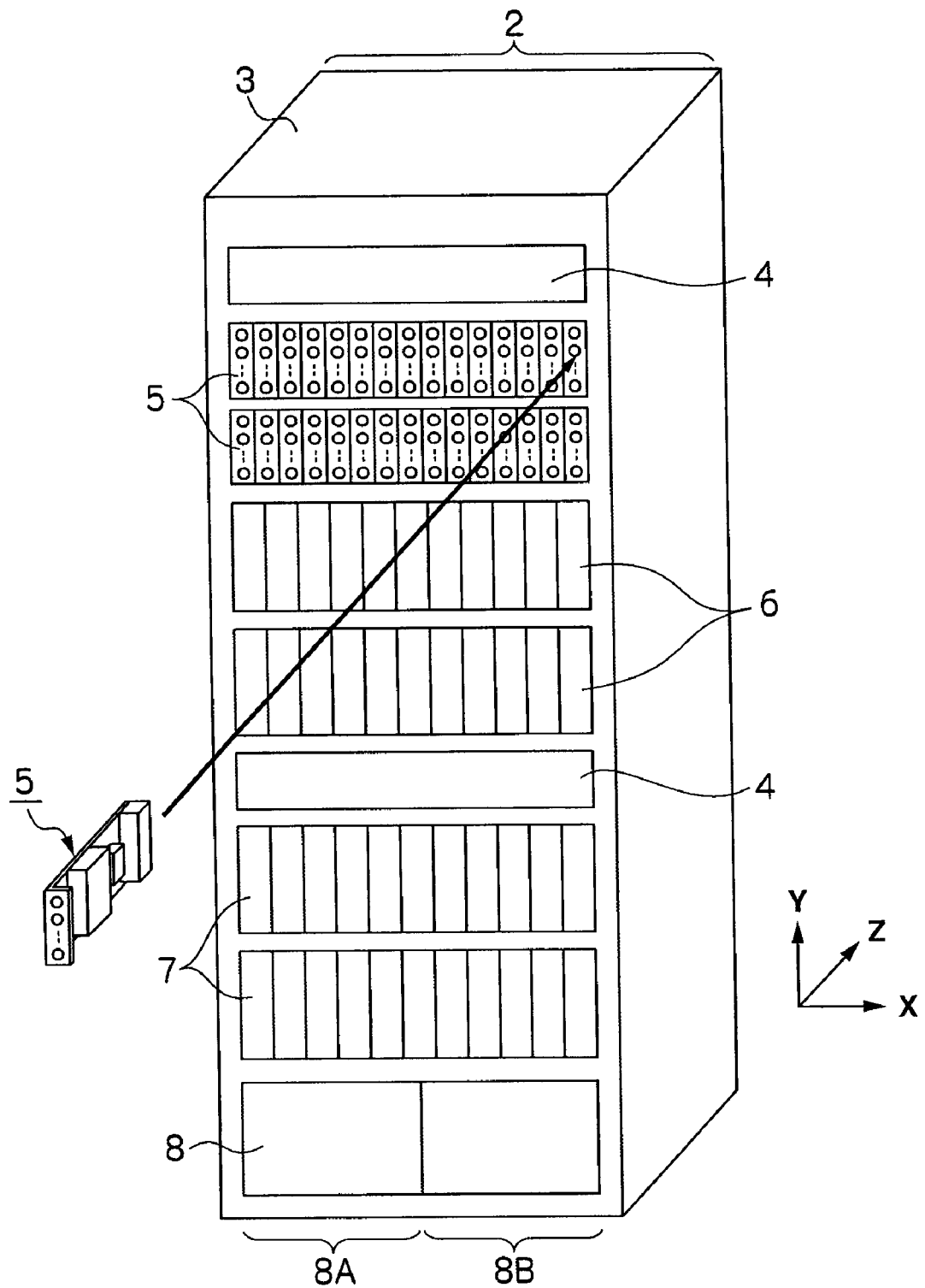
FIG. 1 is a perspective view of the exterior configuration of a storage controller according to a first embodiment.

DETAILED DESCRIPTION OF PREFERRED EMBODIMENTS (1) First Embodiment (1-1) Exterior Configuration of Storage System Reference numeral 2 in FIG. 1 represents a storage controller according to this embodiment. This storage system 1 is equipped with the storage controller 2 having a data input/output function that controls data input and output.

The storage controller 2 contains, in a rectangular parallelepiped rack frame 3, a plurality of cooling fan units 4, flash memory packages 5, hard disk drive units 6, logical substrates 7, and power source units 8.

The rack frame 3 is configured so that the inside space is divided by partitions into a plurality of shelves. According to the first embodiment, the inside of the rack frame 3 is divided into nine shelves in total; the cooling fan units 4 are placed on the uppermost shelf and the sixth shelf from the top; the flash memory packages 5 are placed on the second and third shelves from the top; the hard disk drive units 6 are placed on the fourth and fifth shelves from the top; the logical substrates 7 are placed on the seventh and eighth shelves from the top; and the power source units 8 are placed on the lowest shelf.

The cooling fan unit 4 is a unit containing one or more fans and is used to discharge heat generated by the flash memory packages 5, the hard disk drive units 6, the logical substrates 7, and the power source units 8 out of the rack frame 3.

Figure 2:
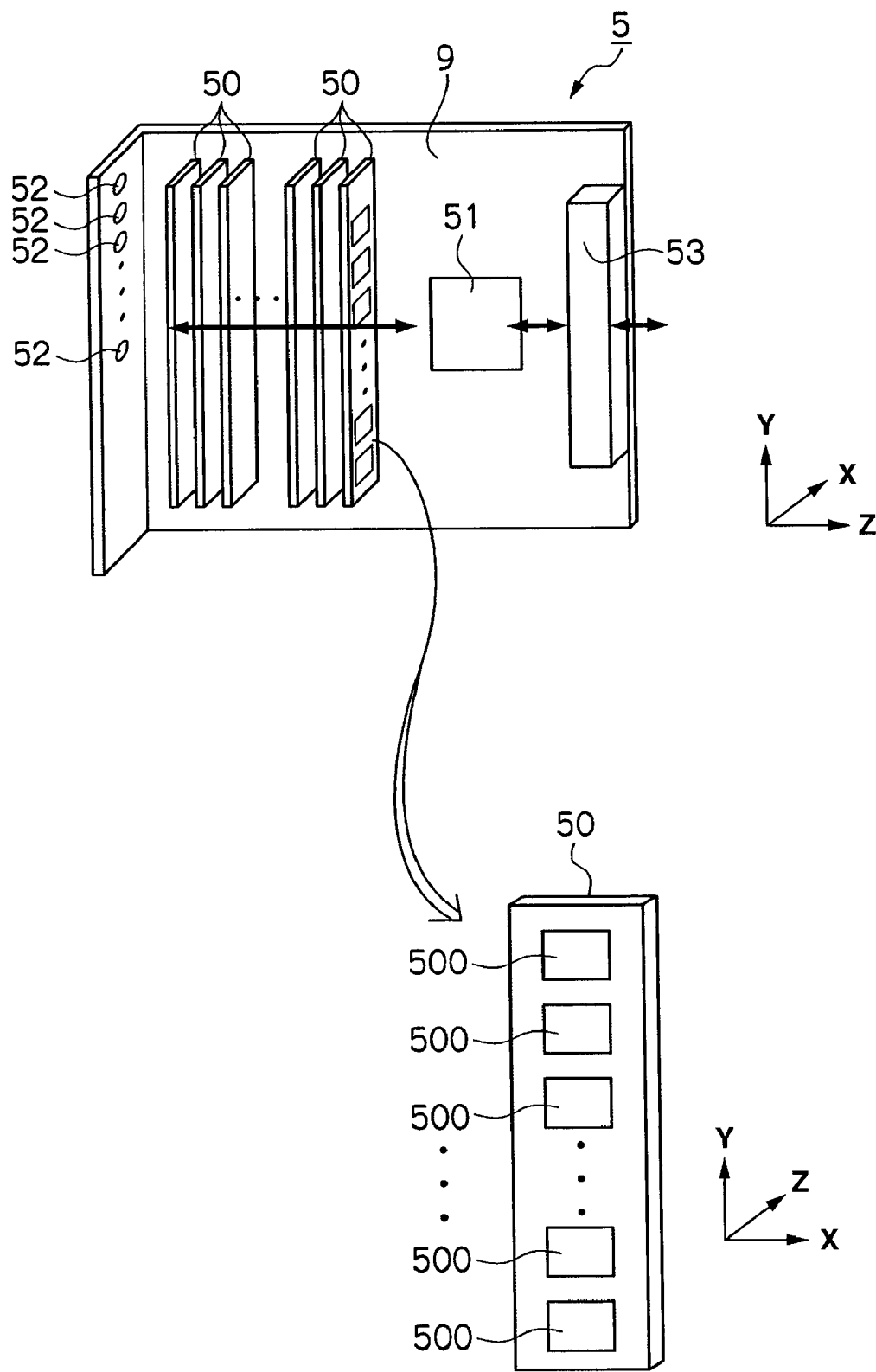
FIG. 2 is a configuration diagram of a flash memory package according to the first embodiment.

As shown in FIG. 2 for example, the flash memory package 5 is configured so that flash memory modules 50, each containing flash memory chips (hereinafter referred to as the "flash memory") 500, are mounted on a wiring substrate 9 of predetermined size and can be freely replaced. A flash memory control unit 51 for controlling data input to and output from the flash memory 500 is mounted on the wiring substrate 9.

Figure 3:
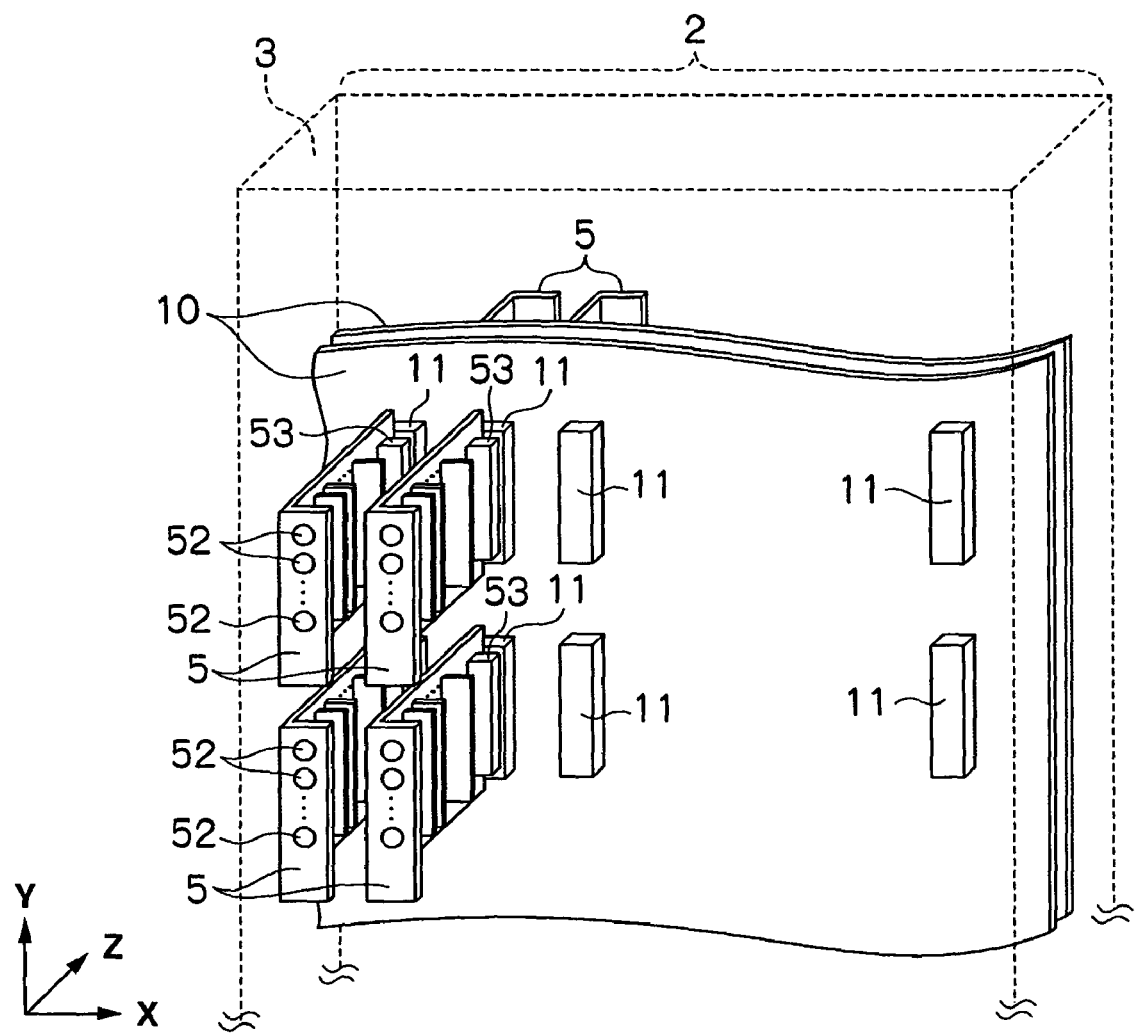
FIG. 3 is a schematic perspective view of the flash memory packages according to the first embodiment.

As shown in FIG. 3, as many LEDs (Light Emitting Diodes) 52 as there are flash memory modules 50 mounted are placed on the front-end side of the flash memory package 5, so that a failure of any flash memory module 50 can be reported to an outside observer. Also, the front-end side of the flash memory package 5 is formed as a door panel that can be opened.

A connector 53 is provided on the rear-end side of the flash memory package 5. The connector 53 is made to engage with a connector 11 on a back board 10 located in the rack frame 3 so that the flash memory package 5 is physically and electrically connected with the back board 10.

In the first embodiment, the flash memory modules 50 are mounted on the wiring substrate 9 in such a manner that the flash memory modules 50 can be replaced by inserting them into the wiring substrate 9 in a direction (X direction in FIG. 3) perpendicular to the direction (Z direction in FIG. 3) of insertion of the flash memory package 5 into the rack frame 3.

Figure 4:
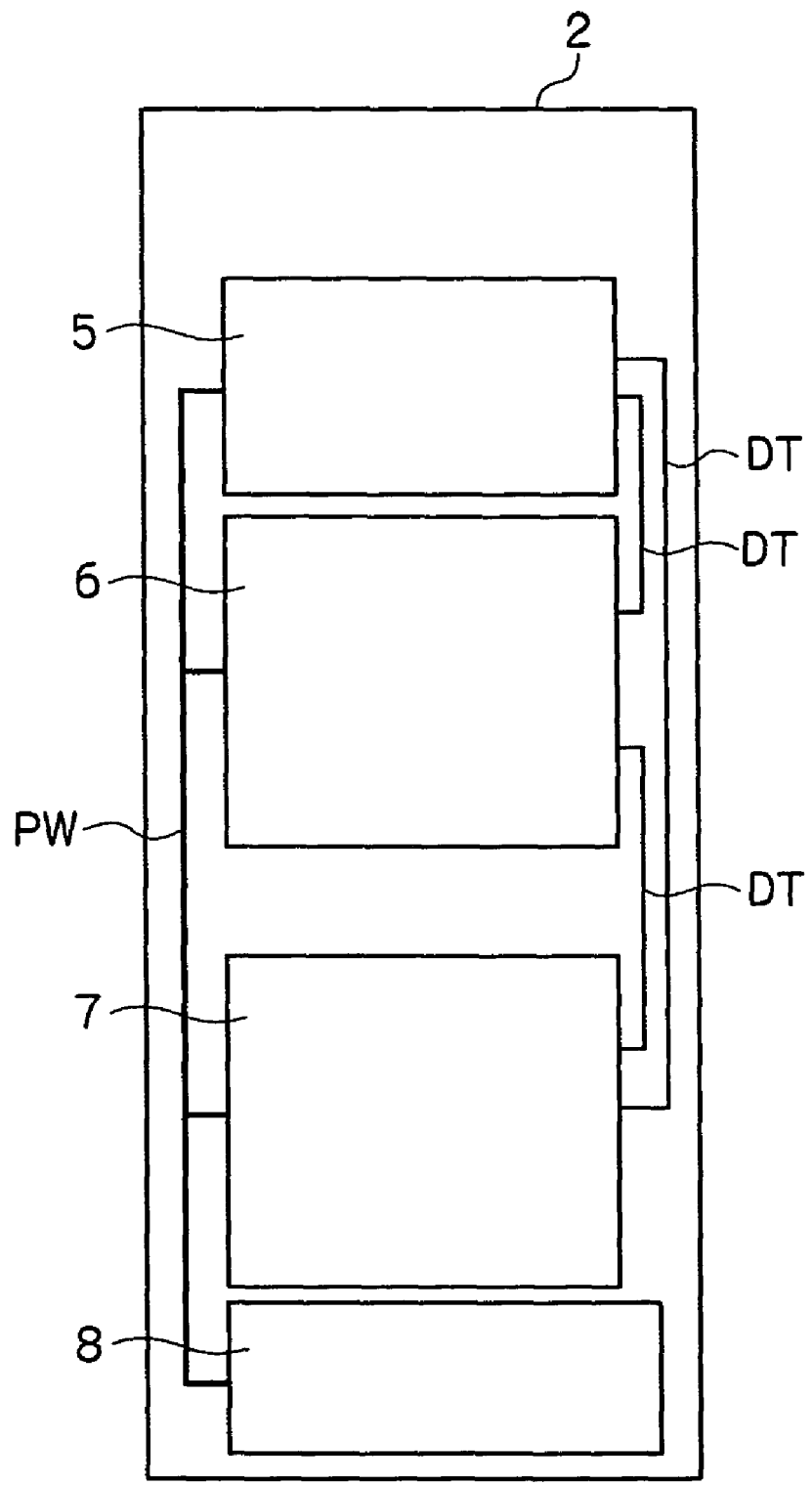
FIG. 4 is a connection diagram of the storage controller according to the first embodiment.

The hard disk drive unit 6 is configured by placing hard disk drives 60 (size: 3.5 inches, for example) in a housing of predetermined size. A connector (not shown in the drawing) is provided on the rear-end side of this housing. The connector is made to engage with the connector 11 on the back board 10 located in the rack frame 3 so that the hard disk drive unit 6 is physically and electrically connected with the back board 10. Also, as shown in FIG. 4, the hard disk drive units 6 are electrically connected via communication lines DT with the flash memory packages 5 so that they can transfer data and communicate control signals or similar with each other.

The logical substrate 7 is configured so that a channel adapter 700 (described later in detail), cache memory 705, disk adapter 706, and other components are formed on the logical substrate 7. The logical substrate 7 is connected to the back board 10 located in the rack frame 3 so that the logical substrate 7 can be freely inserted into or pulled out of the back board 10. The logical substrate 7 is configured so that it can communicate via the back board 10 with other logical substrates 7 mounted in the rack frame 3. Also, as shown in FIG. 4, the disk adapters 706 (described later in detail) of the logical substrates 7 are electrically connected via communication lines DT with the flash memory packages 5 or the hard disk drive units 6 so that they can transfer data and communicate control signals or similar to each other.

The power source unit 8 is composed of a power source unit section 8A and a battery unit section 8B. Of these sections, the power source unit section 8A converts alternating current power from a commercial power source into direct current power and supplies the obtained direct current power via a power supply line PW to each section of the storage controller 2.

A management terminal 12 is a server computer device operated to manage the storage controller 2 and is composed of, for example, a notebook personal computer. The management terminal 12 monitors the occurrence of failures in the storage controller 2 and can display the status on a display screen 120.

(1-2) Internal Configuration of Storage System

Figure 5:
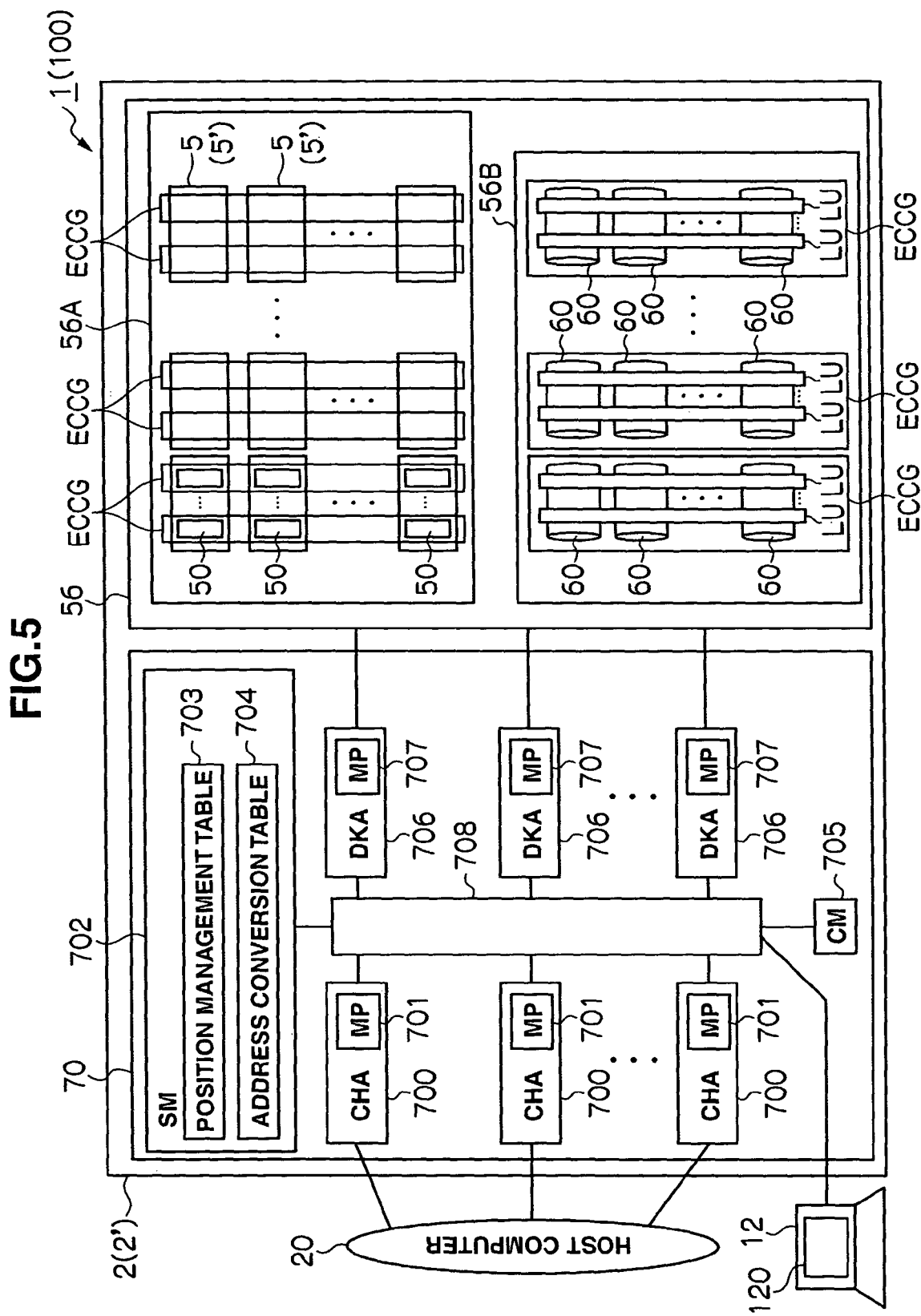
FIG. 5 is a block diagram showing the entire configuration of a storage system according to the first embodiment.

Reference numeral 1 in FIG. 5 represents a storage system according to the first embodiment. FIG. 5 shows the internal configuration of the storage system 1 according to the first embodiment. The storage system 1 is configured as shown in FIG. 5 so that the storage controller 2 including a controller unit 70 for controlling data input to and output from the host computer 20, and a recording unit 56 for saving data from the host computer 20 are connected via a network (not shown in the drawing) with the host computer 20 or the management terminal 12.

The controller unit 70 is configured so that channel adapters 700, shared memory 702, cache memory 705, and disk adapters 706 are connected via a connecting part 708. Data and commands are sent and received between the channel adapters 700, the shared memory 702, the cache memory 705, and the disk adapters 706 via, for example, a switch or a bus like a very high speed crossbar switch for transmitting data by means of high-speed switching.

Each channel adapter 700 is configured as a microcomputer system equipped with, for example, a microprocessor 701, local memory (not shown in the drawing), and a communication interface (not shown in the drawing). The channel adapter 700 interprets various commands sent from the host computer 2 and executes the required processing. The channel adapter 700 port (not shown in the drawing) is given a network address (such as an Internet Protocol [IP] address or a World Wide Name [WWN]) to identify itself. Accordingly, each channel adapter 700 can individually act as NAS (Network Attached Storage).

The shared memory 702 is storage memory shared by the channel adapters 700 and the disk adapters 706. The shared memory 702 is mainly used to store, for example, various tables 703 and 704 (described later in detail), system configuration information, various control programs, and commands from the host computer 2.

The cache memory 705 is also storage memory shared by the channel adapters 700 and the disk adapters 706. This cache memory 705 is mainly used to temporarily store user data input to or output from the storage controller 2.

Each disk adapter 706 is configured as a microcomputer system equipped with, for example, a microprocessor 707 and memory (not shown in the drawing), and functions as an interface for controlling protocol when communicating with the recording unit 56. The disk adapter 706 is connected to the recording unit 56 mounted in the storage controller 2 via, for example, a Fibre Channel cable, and sends/receives data to/from the recording unit 56 according to Fibre Channel Protocol.

The recording unit 56 is composed of a flash memory package group 56A and a hard disk drive group 56B.

The flash memory package group 56A is configured so that flash memory packages 5 are connected in series and plural sets of the series-connected flash memory packages 5 are arranged in parallel with the disk adapters 706. One flash memory package 5 is composed of a plurality of flash memory modules 50. One flash memory module 50 contains a plurality of flash memory chips 500. The flash memory 500 is rewritable nonvolatile semiconductor memory.

In the first embodiment, the flash memory modules 50 are arranged in parallel to constitute one ECC (Error Correcting Code) group to handle signals sent and received by the disk adapters 706. One or more logical volumes (hereinafter referred to as the "logical volumes") are set in physical storage areas provided by one ECC group. Data from the host computer 2 is written and read in blocks of predetermined size, which constitutes a data management unit in the flash memory 500, to and from the logical volumes. Incidentally, the term "ECC group(s)" in the first embodiment is used synonymously with RAID groups prepared by logically grouping storage areas to read and write data sent or received in response to one data read/write request by distributing the data to a plurality of storage area groups.

The hard disk drive group 56B is formed by having a plurality of hard disk drive units 6 mounted in the storage controller 2 constitute one ECC group. The hard disk drives 60 are contained in the hard disk drive units 6 and mounted in the storage controller 2 as described above, and the hard disk drives 60 are operated according to the RAID system. One or more logical volumes LU are defined on storage areas provided by the hard disk drives 60. Data from the host computer 20 is written and read in blocks of predetermined size to and from the logical volumes LU.

Each logical volume VU is given its own unique identifier (LUN: Logical Unit Number). In this embodiment, user data input and output is conducted by designating, as an address, a combination of the above-mentioned identifier and a unique block number (LBA: Logical Block Address) assigned to each block.

(1-3) Internal Configuration of Flash Memory Package

Figure 6:
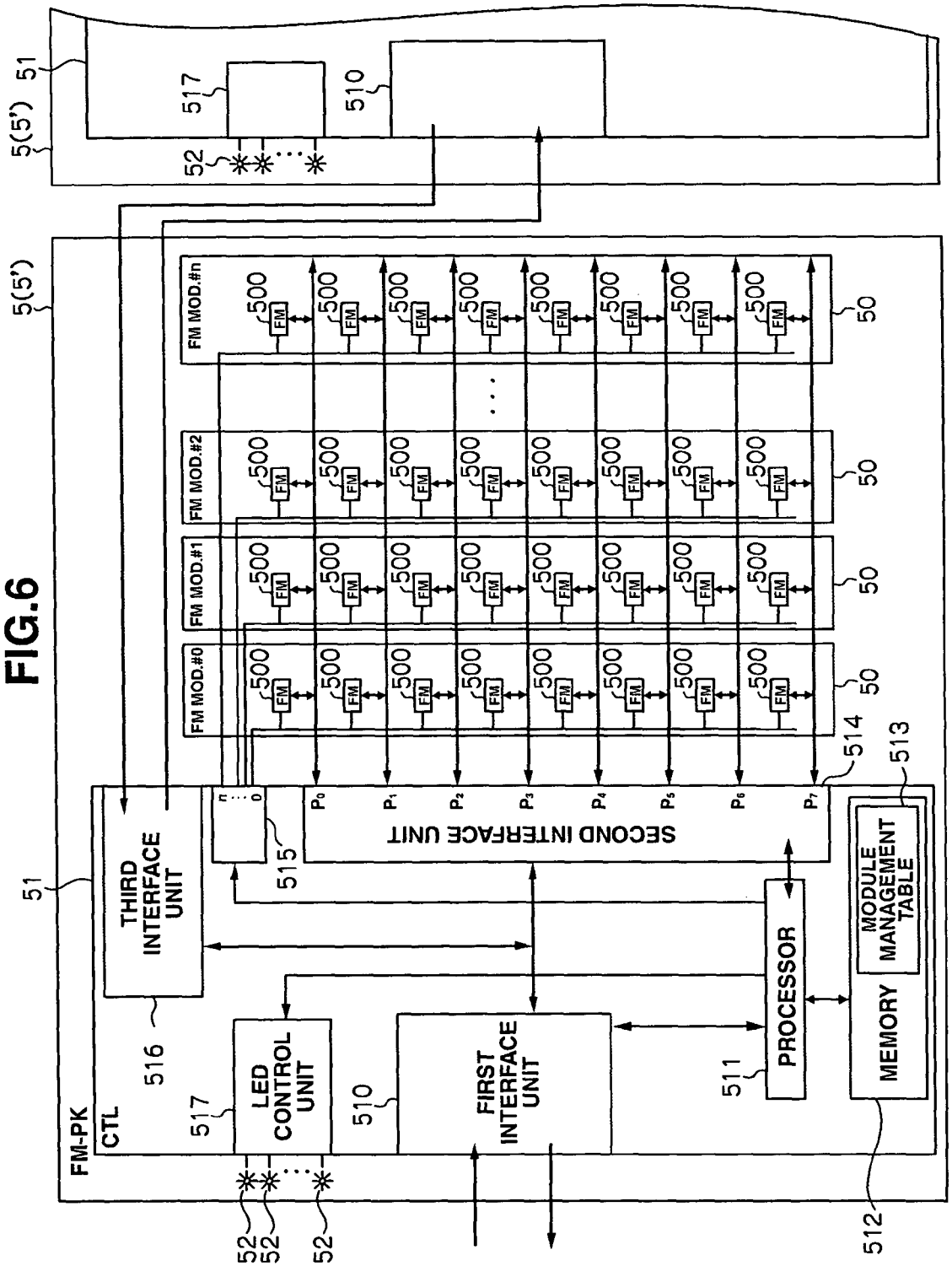
FIG. 6 is a block configuration diagram of the flash memory package according to the first embodiment.

FIG. 6 shows the internal configuration of the flash memory package 5 according to the first embodiment. As shown in FIG. 6, the flash memory package 5 includes, in the flash memory control unit 51: a first interface unit 510 for controlling data input and output between the disk adapters 706 and the flash memory control unit 51; a processor 511 in control of the operation of the entire flash memory package 5; memory 512; a second interface unit 514 for controlling data input and output between the flash memory control unit 51 and the flash memory modules 50; a flash memory power source unit 515 for controlling the power source of the flash memory modules 50; a third interface unit 516 for controlling data input to and output from other flash memory packages 5; and an LED control unit 517 for controlling the LEDs 52.

The first interface unit 510 is an interface that interconverts a serial line on the disk adapter 706 side and a parallel line on the flash memory package 5 side.

The memory 512 has a module management table 513 (described later in detail) for inputting and outputting data to and from the flash memory module 50 designated by the host computer 20.

The second interface unit 514 has a plurality of I/0 ports P corresponding to a plurality of flash memory chips 500 in the flash memory modules 50.

The I/O ports P are ports for controlling data input to and output from the respective flash memory chips in a plurality of flash memory modules 50. The second interface unit 514 according to the first embodiment has eight ports P0 to P7. For example, port P0 can control data input to and output from the first flash memory chip 500 in each of the flash memory modules 50.

The flash memory power source unit 515 controls the power source in each flash memory module 50 to turn it on or off in order to input or output data to or from the flash memory module 50 designated by the host computer 20. The flash memory power source unit 515 according to the first embodiment controls the power source for the designated flash memory module 50 to be turned on only when inputting or outputting data to or from the designated flash memory module 50. Accordingly, the flash memory power source unit 515 controls the power sources for all the flash memory modules 50 to be normally off. The flash memory power source unit 515 also controls assertion or de-assertion of a CS (Chip Select) signal used for applying power to the flash memory modules 5 and an OE (Output Enabling) signal permitting data output to the flash memory modules 5.

When the host computer 20 designates another flash memory module 50, the third interface unit 516 controls data input and output between the first designated flash memory module 50 and the next flash memory module 50 connected in series.

If a failure occurs in a certain flash memory module 50, the LED control unit 517 controls the LEDs 52 to turn on the LED 52 corresponding to the flash memory module 50 in which a failure has occurred.

(1-4) Configuration of Tables

One of the characteristics of the storage system 1 according to the first embodiment is its ability to perform power-on-and-off control of the designated flash memory module 50 on a flash memory module 50 basis by utilizing its special property, i.e., a fast power-on-and-off speed of the flash memory 500.

In order to realize the above-described characteristic, the shared memory 702 stores a position management table 703 and an address conversion table 704.

As shown in FIG. 7, the position management table 703 is a table that manages: data addresses (indicated as logical addresses in the storage controller 2) of where data from the host computer 20 should be written; and whether or not the data is stored in the cache memory 705 and/or the hard disk drive 60. The position management table 703 is composed of: a "data address" field 703A mentioned above; a "CM" field 703B that shows whether data from the host computer 20 is temporarily stored in the cache memory 705 or not; and an "HDD" field 703C that shows whether data from the host computer 20 is temporarily stored in the hard disk drive 60 or not.

If the data from the host computer 20 is temporarily stored in the cache memory 705, a flag is set to on in the "CM" field 703B (indicated as "◯" in the drawing). Similarly, if the data is temporarily stored in the hard disk drive 60, a flag is set to on in the "HDD" field 703C (indicated as "◯" in the drawing).

As shown in FIG. 8, the address conversion table 704 is a table that manages a correspondence relationship between data addresses (indicated as logical addresses in the storage controller 2) of where data from the host computer 20 should be written; and locations of the data stored in the logical volumes LU and the flash memory modules 50.

The address conversion table 704 is composed of: a "data address" field 704A mentioned above; an "LU number" field 704B that shows the logical volume LU where the data is stored in the hard disk drive group 56B; an "LU-ECCG" field 704C that shows the ECC group that the relevant logical volume LU belongs to; an "FM module number" field 704D that shows the flash memory module 50 where the data is stored in the flash memory package group 56A; and an "FM-ECCG" field 704E that shows the ECC group the relevant flash memory module 50 belongs to.

As is apparent from the above description, the various tables 703 and 704 in the shared memory 702 are the tables created and updated based on data addresses.

If data from the host computer 20 is transferred to an arbitrary flash memory package 5 based on the various tables 703 and 704, the data is stored according to a module management table 513 contained in the memory 512 in that flash memory package 5.

As shown in FIG. 9, the module management table 513 is prepared for each flash memory package 5 and manages the flash memory control unit 51 and the flash memory modules 50 of the relevant flash memory package 5. The module management table 513 does not have information about other flash memory modules 5 and manages, in the form of a table, only information about the relevant flash memory modules 5 belonging to that flash memory package 5.

The module management table 513 is composed of: a "CTL NAME" field 513A where an identification number is given to the relevant flash memory control unit 51 in order to identify itself within a plurality of flash memory packages 5; and an "FM module number" field 513B where an identification number is given to the relevant flash memory modules 50 controlled by the relevant flash memory control unit 51.

(1-5) Initialization

In order to realize the characteristic of the present invention, an administrator first needs to initialize the storage system 1 according to the first embodiment.

Figure 10:
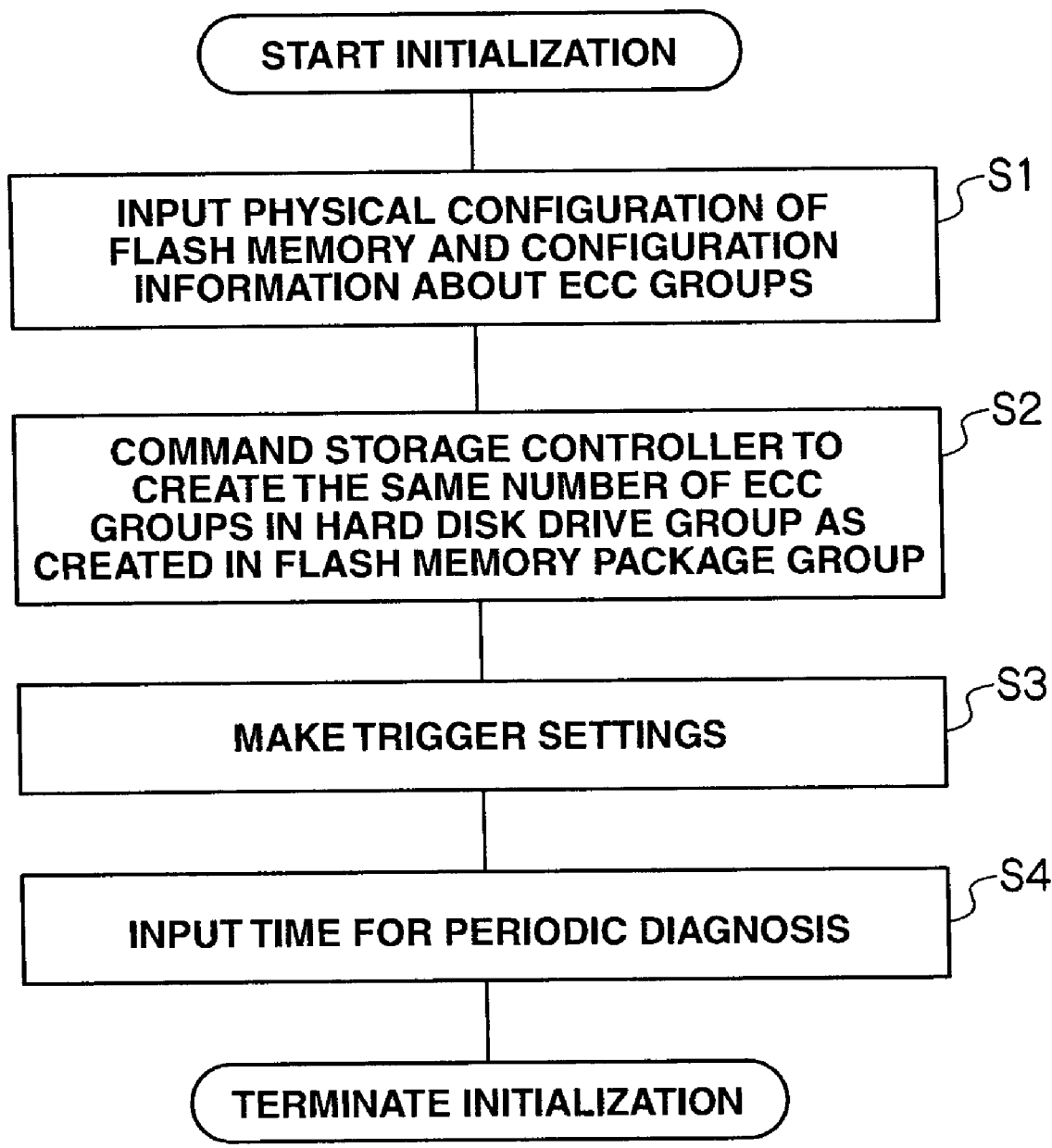
FIG. 10 is a flowchart illustrating initialization processing according to the first embodiment.

As shown in FIG. 10, the administrator inputs the settings for the flash memory package group 56A on a management screen 120 of the management terminal 12. Specifically, the administrator inputs the physical configuration of the flash memory 500 and the configuration information about the ECC groups (S1).

In the first embodiment, for example, the administrator inputs the total number, total capacity, and other necessary information about the ECC groups wherein eight flash memory chips 500 constitute one flash memory module 50, and four flash memory modules constitute one ECC group.

Next, the administrator commands the storage controller 2 to create the same number of ECC groups in the hard disk drive group 56B as there are in the flash memory package group 56A (S2).

The storage system 1 according to the first embodiment employs the flash memory 500 as storage devices in place of conventional hard disk drives in order to improve data reading properties, and also employs the hard disk drives 60 as buffers used upon writing data in order to reduce the number of times data is written to the flash memory 500. Accordingly, the number of ECC groups formed in the flash memory package group 56A is set to be the same as the number of ECC groups formed in the hard disk drive group 56B. As a result, data stored in the hard disk drive group 56B can be easily moved to the flash memory package group 56A.

In addition, all that is required is that the hard disk drive 60 has a minimum capacity as a buffer capable of temporarily storing data, and the hard disk drive 60 does not have to have the same capacity as the flash memory package group 56A.

Subsequently, the administrator makes trigger settings for when to move data stored in the hard disk drive group 56B to the flash memory package group 56A (S3). For example, the administrator makes trigger settings so that, for example, data will be moved once a day or when the data usage rate in the ECC groups formed in the hard disk drive group 56B exceeds 80%.

At the end, the administrator inputs the time for a periodic diagnosis of the flash memory package group 56A (S4).

The flash memory 500 in all the flash memory modules 50 is controlled so that its power is normally off. As a result, it is necessary to periodically diagnose the flash memory 500 to find, for example, whether the flash memory 500 is in proper working condition or a failure has occurred in the flash memory 500. The periodic diagnosis may be set to be when the occurrence of a failure can be detected, and the time setting is made so that the periodic diagnosis is conducted, for example, once a day.

After the administrator sets the various parameters for initialization as described above, the initialization is terminated.

(1-6) Data Read/Write Processing

The outlines of data write processing and data read processing executed by the storage system 1 after initialization will be described below. The data read/write processing is executed by a microprocessor 701 for the channel adapter 700 or a microprocessor 707 for the disk adapter 706 according to data read/write programs (not shown in the drawing) in the shared memory 702.

(1-6-1) Data Write Processing

Figure 11:
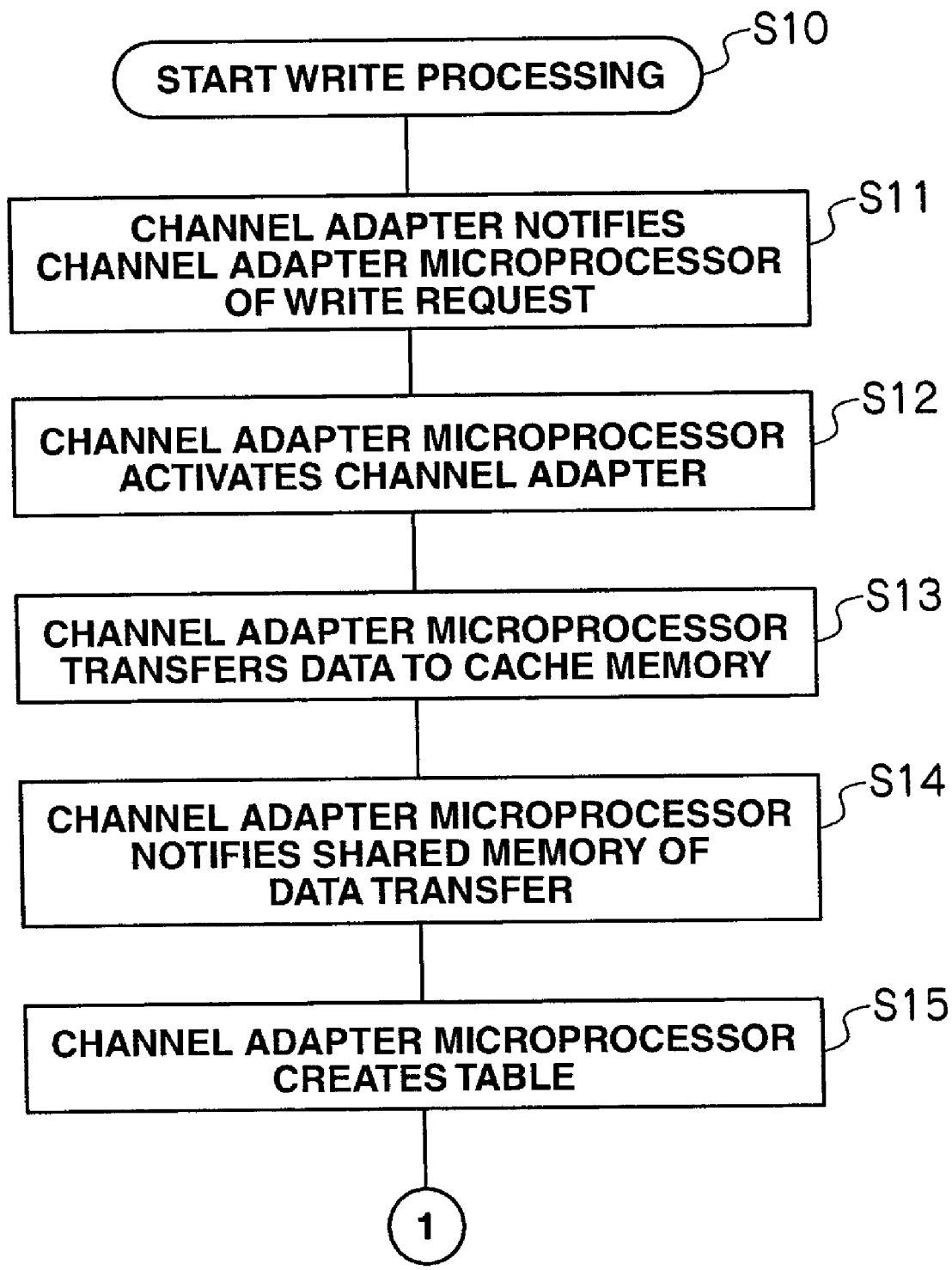
FIG. 11 is a flowchart illustrating write processing according to the first embodiment.
Figure 12:
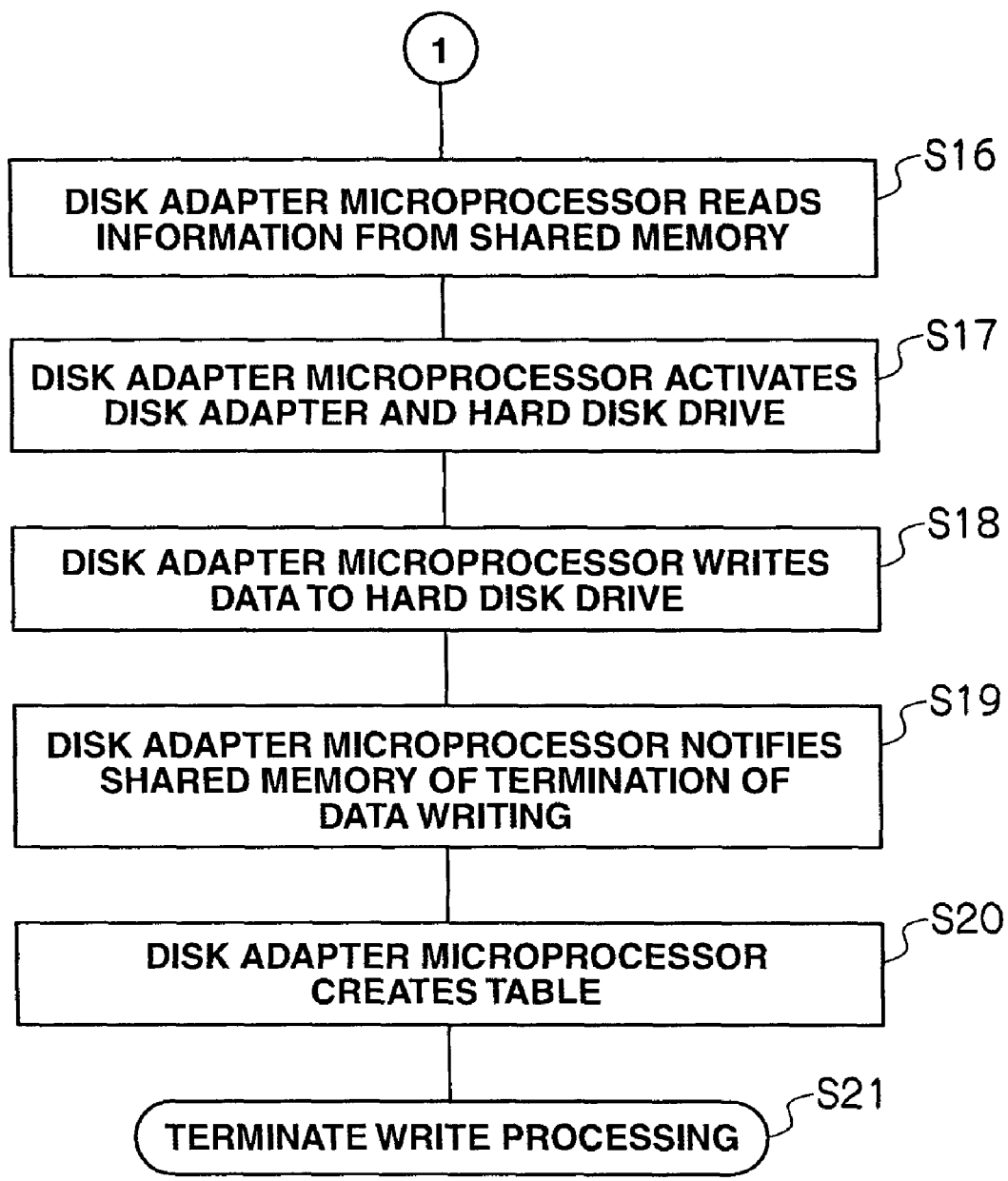
FIG. 12 is a flowchart illustrating the write processing according to the first embodiment.

As shown in FIGS. 11 and 12, after receiving a write request from the host computer 20, the channel adapter 700 starts the write processing (S10).

After receiving the write request, the channel adapter 700 notifies the microprocessor 701 for the channel adapter 700 of the receipt of the write request (S11). Then, the microprocessor 701 for the channel adapter 700 activates the channel adapter 700 (S12) and transfers the data received by the channel adapter 700 from the host computer 20 to the cache memory 705 (S13).

The microprocessor 701 for the channel adapter 700 notifies the shared memory 702 of the data transfer to the cache memory 705 (S14), and then creates the position management table 703 and the address conversion table 704 (S15).

Specifically speaking, the microprocessor 701 for the channel adapter 700 adds the data address of the data transferred to the cache memory 705 to the "data address" fields 703A, 704A. The microprocessor 701 for the channel adapter 700 sets a flag to the "CM" field 703B. As an example of setting a flag according to the first embodiment, the "○" information is added to the relevant field.

If the microprocessor 707 for the disk adapter 706 determines, by reading information in the various tables 703 and 704 in the shared memory 702, that the data has been written to the cache memory 705 (S16), the microprocessor 707 activates the disk adapter 706 and the hard disk drive 60 to prepare for data transfer (S17).

Then the microprocessor 707 for the disk adapter 706 writes the data, which is temporarily stored in the cache memory 705, to the logical volume LU designated by the host computer 20 as the location where the data should be stored (S18).

After the microprocessor 707 for the disk adapter 706 notifies the shared memory 702 of the data transfer to the logical volume LU on the hard disk drive 60 (S19), the microprocessor 707 updates the position management table 703 and the address conversion table 704 (S20).

Specifically, the microprocessor 707 for the disk adapter 706 sets a flag to the "HDD" field 703C corresponding to the data address. As an example of setting a flag according to the first embodiment, the "○" information is added to the relevant field. The microprocessor 707 also adds the LU number to the "LU number" field 704B, and adds the ECC group number, to which the added logical volume LU belongs, to the "LU-ECCG" field 704C.

Subsequently, the microprocessor 707 terminates the write processing (S21).

(1-6-2) Processing for Writing Data to Flash Memory

The processing executed by the storage system 1 according to the first embodiment for writing data, which is stored in the hard disk drive group 56B as described above, to the flash memory package group 56A in response to a data write request from the host computer 20 will be explained below.

Figure 13:
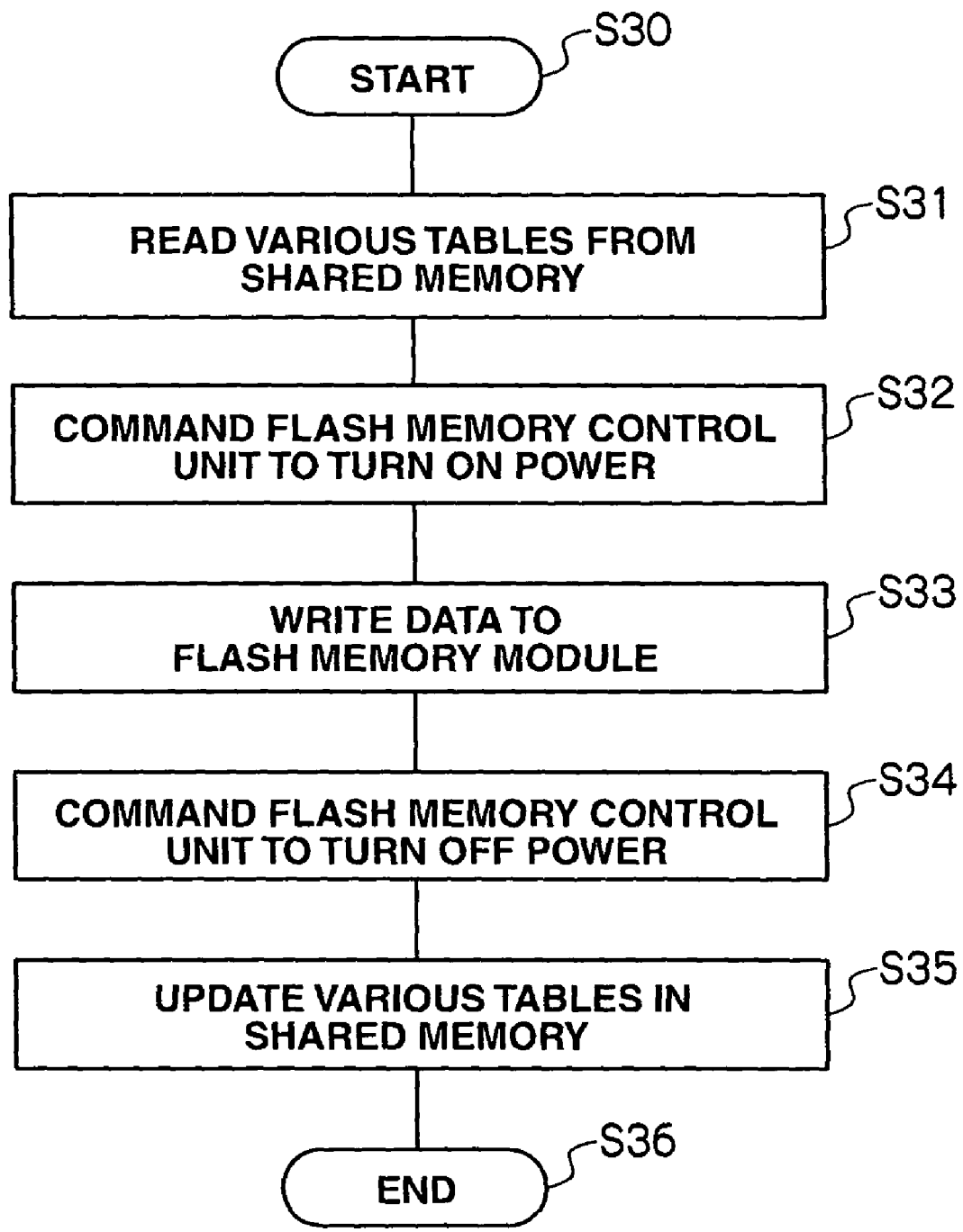
FIG. 13 is a flowchart illustrating the processing for writing data to the flash memory package according to the first embodiment.

Specifically, as shown in FIG. 13, the microprocessor 707 for the disk adapter 706 starts the processing for writing data to the flash memory module 50 at the time set by the administrator in step S3 (S30).

The microprocessor 707 first reads the position management table 703 and the address conversion table 704 in the shared memory 702 (S31). Then, the microprocessor 707 confirms the ECC group of the flash memory package group 56A corresponding to the ECC group to which the logical volume LU storing the data to be migrated belongs, and the microprocessor 707 also confirms the number of the flash memory module 50 that belongs to the ECC group of the flash memory package group 56A (S31).

The microprocessor 707 commands the flash memory package 5 having the flash memory module 50 that belongs to the ECC group corresponding to the ECC group to which the relevant logical volume LU belongs to turn on the power source for the relevant flash memory module 50 (S32).

The microprocessor 707 migrates the data from the logical volume LU in the hard disk drive group 56B to the flash memory module 50 and writes the data in parallel to a plurality of flash memory chips 500 in one flash memory module 50 (S33).

The microprocessor 707 commands the flash memory package 5, to which the flash memory module 50 where the data was written belongs, to turn off the power source for that flash memory module 50 (S34).

The microprocessor 707 updates the address conversion table 704 (S35). Specifically, the microprocessor 707 adds the flash memory module 50 the data was migrated to to the "FM module" field 704D, and also adds the ECC group, to which the flash memory module 50 added to the "FM module number" field 704D belongs and that corresponds to the ECC group to which the relevant logical volume. LU belongs, to the "FM-ECCG" field 704E.

Then, the microprocessor 707 terminates the processing for writing the data to the flash memory module 50 (S36).

Next, transactions between the disk adapter 706 and the flash memory package 5 when the microprocessor 707 for the disk adapter 706 executes the processing for writing data to the flash memory package group 56A will be explained below.

Figure 14:
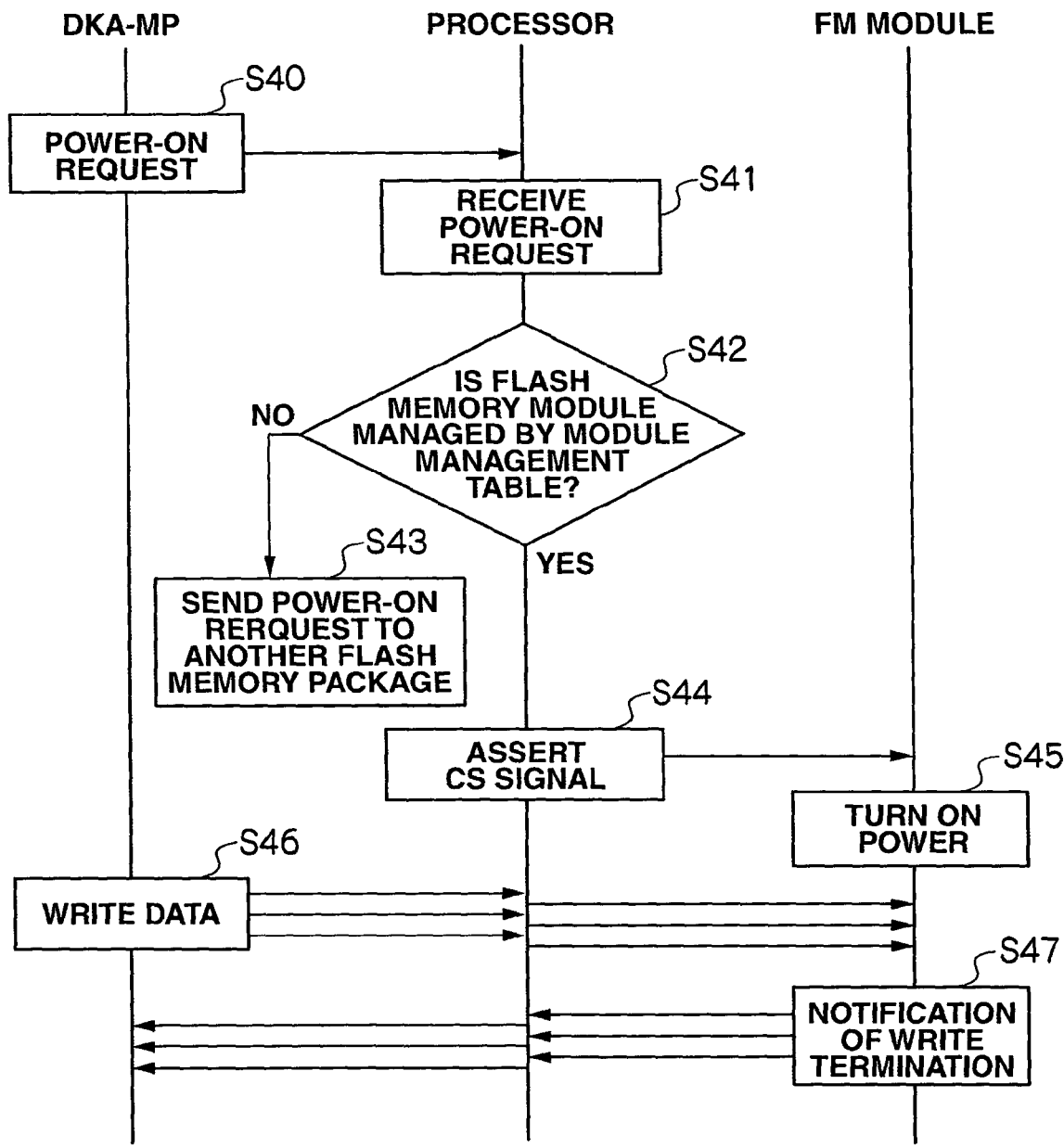
FIG. 14 is a sequence diagram illustrating the processing for writing data to the flash memory package according to the first embodiment.
Figure 15:
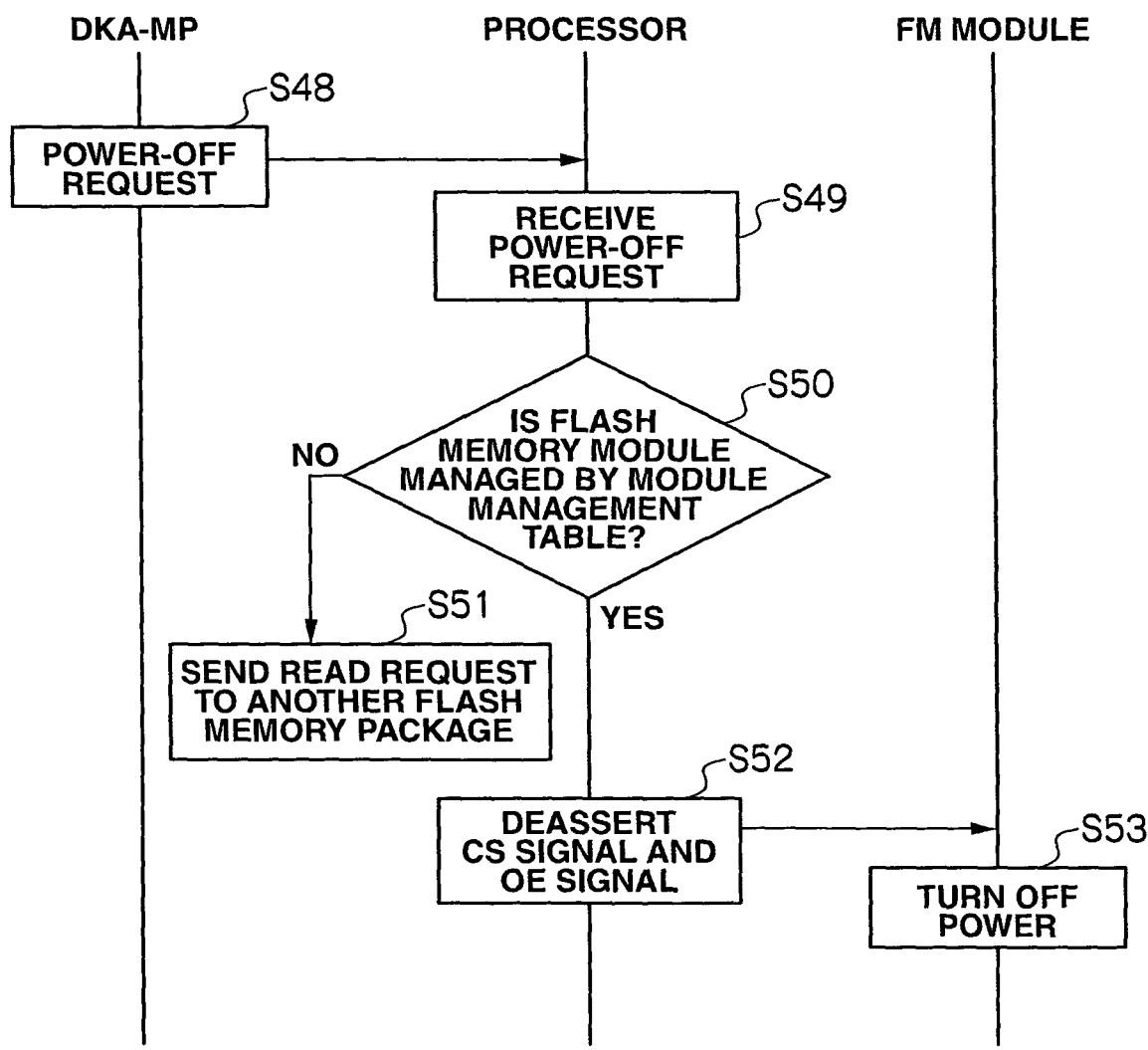
FIG. 15 is a sequence diagram illustrating the processing for writing data to the flash memory package according to the first embodiment.

As shown in FIGS. 14 and 15, the microprocessor 707 for the disk adapter 706 makes a power-on request on an ECC group basis to the flash memory module belonging to the ECC group that corresponds to the ECC group to which the logical volume LU storing the data from the host computer 20 belongs (S40, S32).

After receiving the power-on request from the microprocessor 707 for the disk adapter 706 (S41), the processor 511 for the flash memory control unit 51 reads the module management table 513 and judges whether the requested flash memory module 50 is managed by that module management table 513 (S42).

If the processor 511 determines that the relevant flash memory module 50 is not managed by the module management table 513 (S42: NO), the processor 511 sends the power-on request via the third interface unit 516 to another flash memory package 5 (S43).

If the processor 511 determines that the relevant flash memory module 50 is managed by the module management table 513 (S42: YES), the processor 511 asserts a CS signal to apply power to the flash memory module 50 storing the data requested by the host computer 20 (S44).

In this way, the processor 511 turns on the power source for the flash memory module 50 storing the data requested by the host computer 20 via the flash memory power source unit 515 (S45).

Subsequently, the microprocessor 707 for the disk adapter 706 migrates the data from the logical volume LU to the flash memory module 50 and writes the data in parallel to a plurality of flash memory chips 500 in the flash memory module 50 (S46, S33).

When the flash memory module 50 finishes writing the data to the plurality of flash memory chips 500, it sends a write termination notice to the processor 511, and the processor 511 then sends the write termination notice to the microprocessor 707 for the disk adapter 706 (S47).

After receiving the write termination notice, the microprocessor 707 makes a power-off request on an ECC group basis to the flash memory module 50 of the ECC group to which the data was written (S48, S34).

After receiving the power-off request from the microprocessor 707 (S49), the processor 511 reads the module management table 513 again and judges whether the requested flash memory module 50 is managed by that module management table 513 (S50).

If the processor 511 determines that the relevant flash memory module 50 is not managed by the module management table 513 (S50: NO), the processor 511 sends the read request via the third interface unit 516 to another flash memory package 5 (S51).

If the processor 511 determines that the relevant flash memory module 50 is managed by the module management table 513 (S50: YES), the processor 511 deasserts a CS signal and an OE signal to turn off the power source for the flash memory module 50 storing the data requested by the host computer 20 (S52).

The processor 511 turns off the power source for the flash memory module 50 via the flash memory power source unit 515 (S53).

As described above, the processing for writing data to the flash memory module 50 is executed at a previously set time. In addition, in the processing for writing data to the flash memory module 50, the processor 511 for the flash memory package 5 commands only the designated flash memory module 50 to turn on power, so power saving for the storage system 1 can be promoted.

(1-6-2) Data Read Processing

The case where data stored in the storage controller 2 is read by the storage system 1 according to the first embodiment in response to a data read request from the host computer 20 will be explained below.

Figure 16:
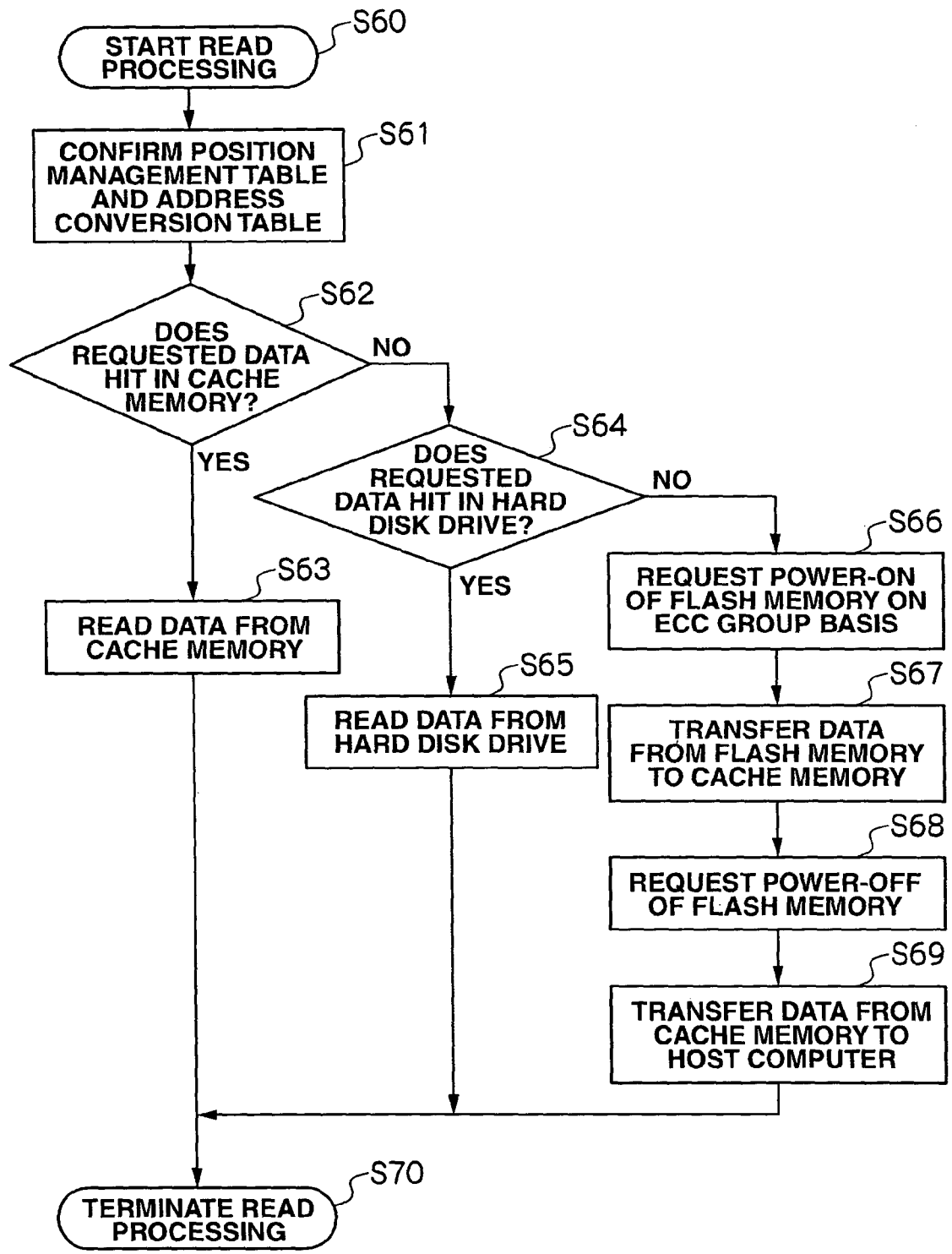
FIG. 16 is a flowchart illustrating read processing according to the first embodiment.

Specifically speaking, the channel adapter 700 starts the data read processing after receiving a data read request from the host computer 20 as shown in FIG. 16 (S60).

The microprocessor 701 for the channel adapter 700 first checks the position management table 703 and the address conversion table 704 in the shared memory 702 (S61). Specifically, the microprocessor 701 confirms whether the data requested by the host computer 20 is stored in the cache memory or the hard disk drive 60. The microprocessor 701 also checks the logical volume LU number and the flash memory address where the data requested by the host computer 20 is stored, in order to confirm the physical storage location of the data requested by the host computer 20.

Next, the microprocessor 701 for the channel adapter 700 judges whether the data requested by the host computer 20 hits in the cache memory 705 or not (S62).

If the microprocessor 701 for the channel adapter 700 determines that the data requested by the host computer 20 hits in the cache memory 705 (S62: YES), the microprocessor 701 reads the data requested by the host computer 20 from the cache memory 705 (S63) and then terminates the data read processing (S70).

On the other hand, if the microprocessor 701 for the channel adapter 700 determines that the data requested by the host computer 20 does not hit in the cache memory 705 (S62: NO), the microprocessor 701 subsequently judges whether the data requested by the host computer 20 hits in the hard disk drive 60 or not (S64).

If the microprocessor 701 for the channel adapter 700 determines that the data requested by the host computer 20 hits in the hard disk drive 60 (S64: YES), the microprocessor 701 reads the data requested by the host computer 20 from the logical volume LU formed from the hard disk drive 60 (S65), and then terminates the data read processing (S70).

If the microprocessor 701 for the channel adapter 700 determines that the data requested by the host computer 20 does not hit in the hard disk drive 60 (S64: NO), the microprocessor 707 for the disk adapter 706 makes a power-on request on an ECC group basis to the flash memory module 50 storing the data requested by the host computer 20 (S66).

After the microprocessor 707 for the disk adapter 706 transfers the data requested by the host computer 20 from the flash memory module 50 to the cache memory 705 (S67), the microprocessor 707 makes a power-off request on an ECC group basis to the flash memory module 50 storing the data requested by the host computer 20 (S68).

After the microprocessor 701 for the channel adapter 700 transfers the data from the cache memory 705 to the host computer 20 (S69), the microprocessor 701 terminates the data read processing (S70).

Next, transactions between the disk adapter 706 and the flash memory package 5 when the microprocessor 707 for the disk adapter 706 executes the processing for reading data from the flash memory package group 56A will be explained.

Figure 17:
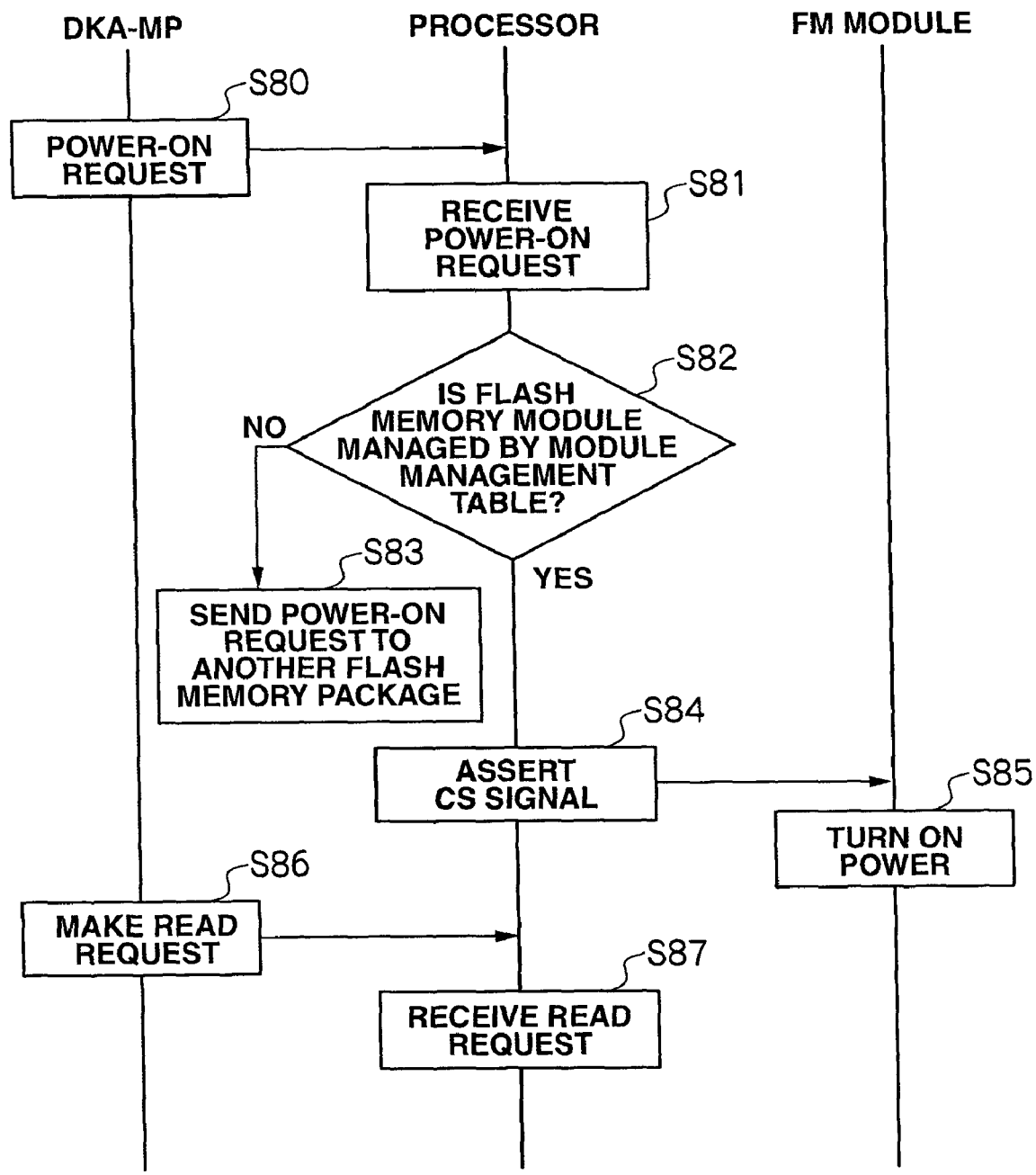
FIG. 17 is a sequence diagram illustrating the processing for reading data from the flash memory package according to the first embodiment.
Figure 18:
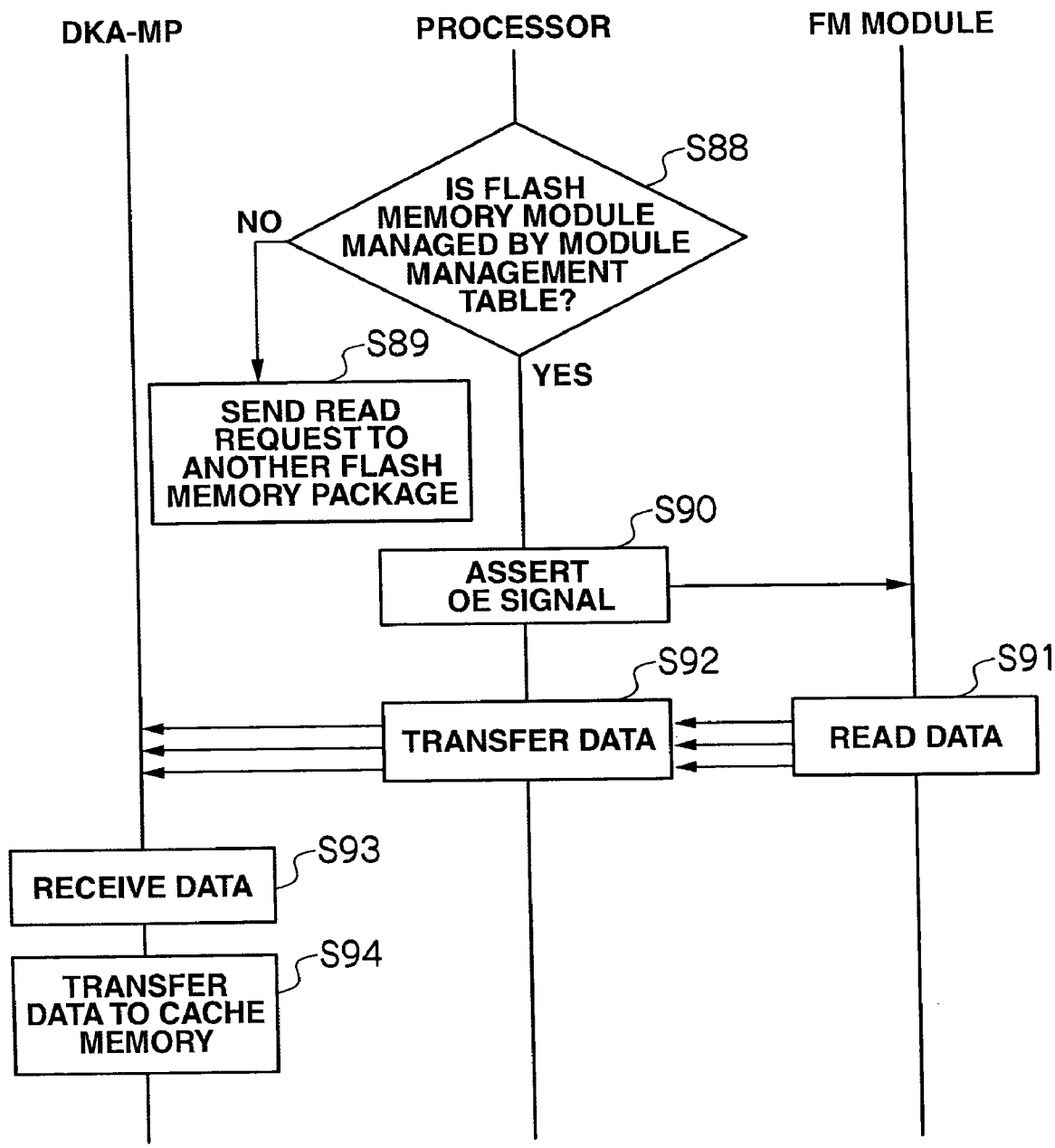
FIG. 18 is a sequence diagram illustrating the processing for reading data from the flash memory package according to the first embodiment.
Figure 19:
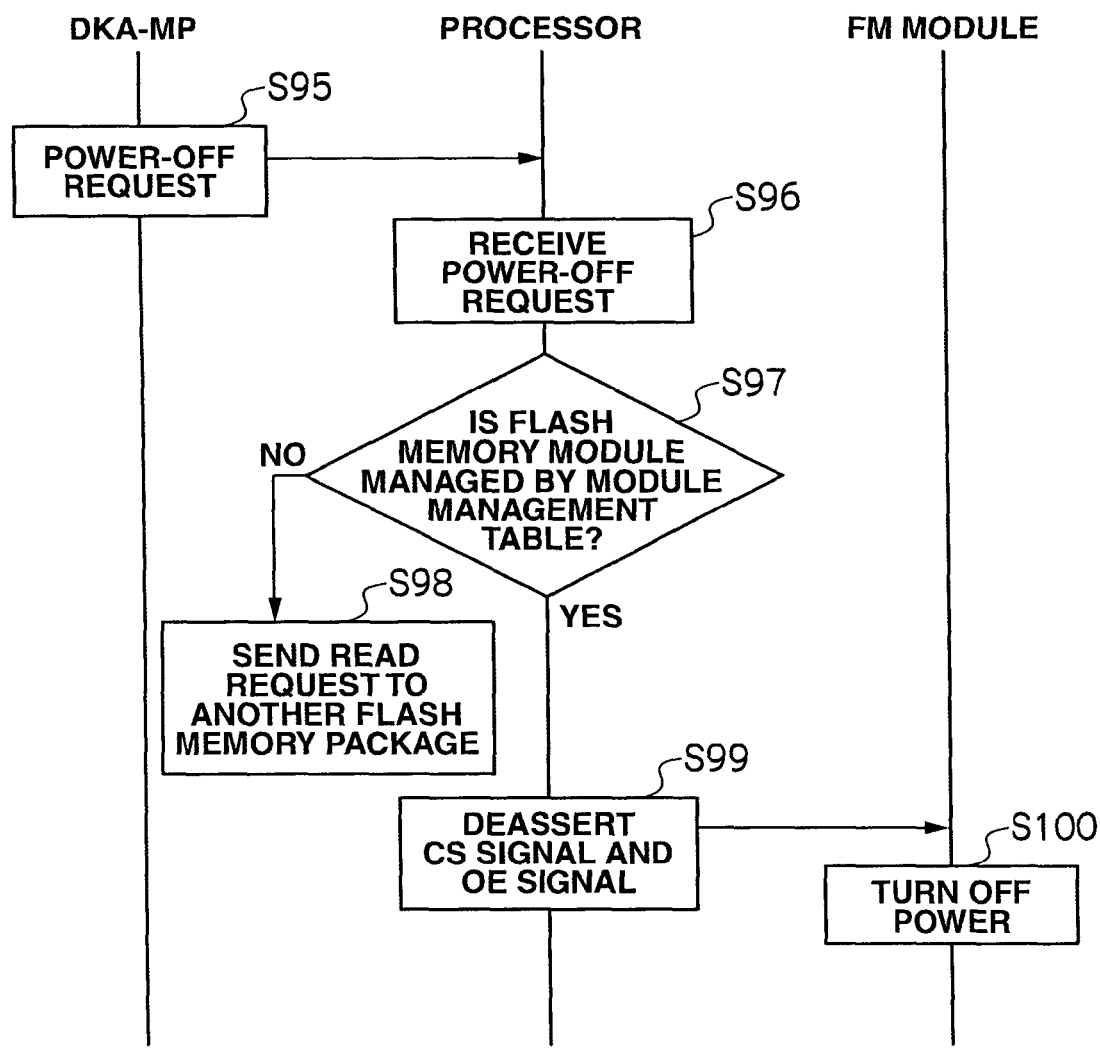
FIG. 19 is a sequence diagram illustrating the processing for reading data from the flash memory package according to the first embodiment.

As shown in FIGS. 17 to 19, the microprocessor 707 for the disk adapter 706 makes a power-on request for the flash memory module 50 of the ECC group, to which the flash memory 500 storing the data requested by the host computer 20 belongs, to the flash memory package group 56A (S80, S66).

Subsequently, the procedures from step S81 to step S85 are performed in the same manner as the procedures from step S 41 to step S 45.

After the power-on request, the microprocessor 707 for the disk adapter 706 makes a data read request to the flash memory package group 56A (S86).

After receiving the data read request from the microprocessor 707 (S87), the processor 511 reads the module management table 513 again and judges whether the requested flash memory module 50 is managed by that module management table 513 (S88).

If the processor 511 determines that the relevant flash memory module 50 is not managed by the module management table 513 (S88: NO), the processor 551 sends the read request via the third interface unit 516 to another flash memory package 5 (S89).

If the processor 511 determines that the relevant flash memory module 50 is managed by the module management table 513 (S88: YES), the processor 511 asserts an OE signal in order to have the respective flash memory chips 500 of the flash memory module 50 output the data requested by the host computer 20 (S90).

After the flash memory module 50 reads the data from the respective flash memory chips 500 in the manner described above, the flash memory module 50 sends the data via the second interface unit 514 to the processor 511 (S91).

The processor 511 transfers the read data, without change, to the disk adapter 706 of the flash memory module 50 requested by the host computer 20 (S92, S67).

After receiving the read data (S93, S67), the microprocessor 707 for the disk adapter 706 transfers the read data to the cache memory 702 (S94, S67).

Subsequently, the procedures from step S95 to step S100 are performed in the same manner as the procedures from step S48 to step S 53.

As described above, in the processing of reading data from the flash memory module 50, the processor 511 for the flash memory package 5 commands only the flash memory module 50 designated on an ECC group basis to turn on power, power saving for the storage system 1 can be promoted.

(1-7) Periodic Diagnosis Processing

All the flash memory modules 50 are controlled so that their power is normally off. Accordingly, it is necessary to periodically diagnose the flash memory package group 56A to find, for example, whether the flash memory package group 56A is in proper working condition or not. The periodic diagnosis processing for the flash memory package group 56A will be explained below. The microprocessor 707 for the disk adapter 706 executes the periodic diagnosis processing according to a periodic diagnosis program (not shown in the drawing).

Figure 20:
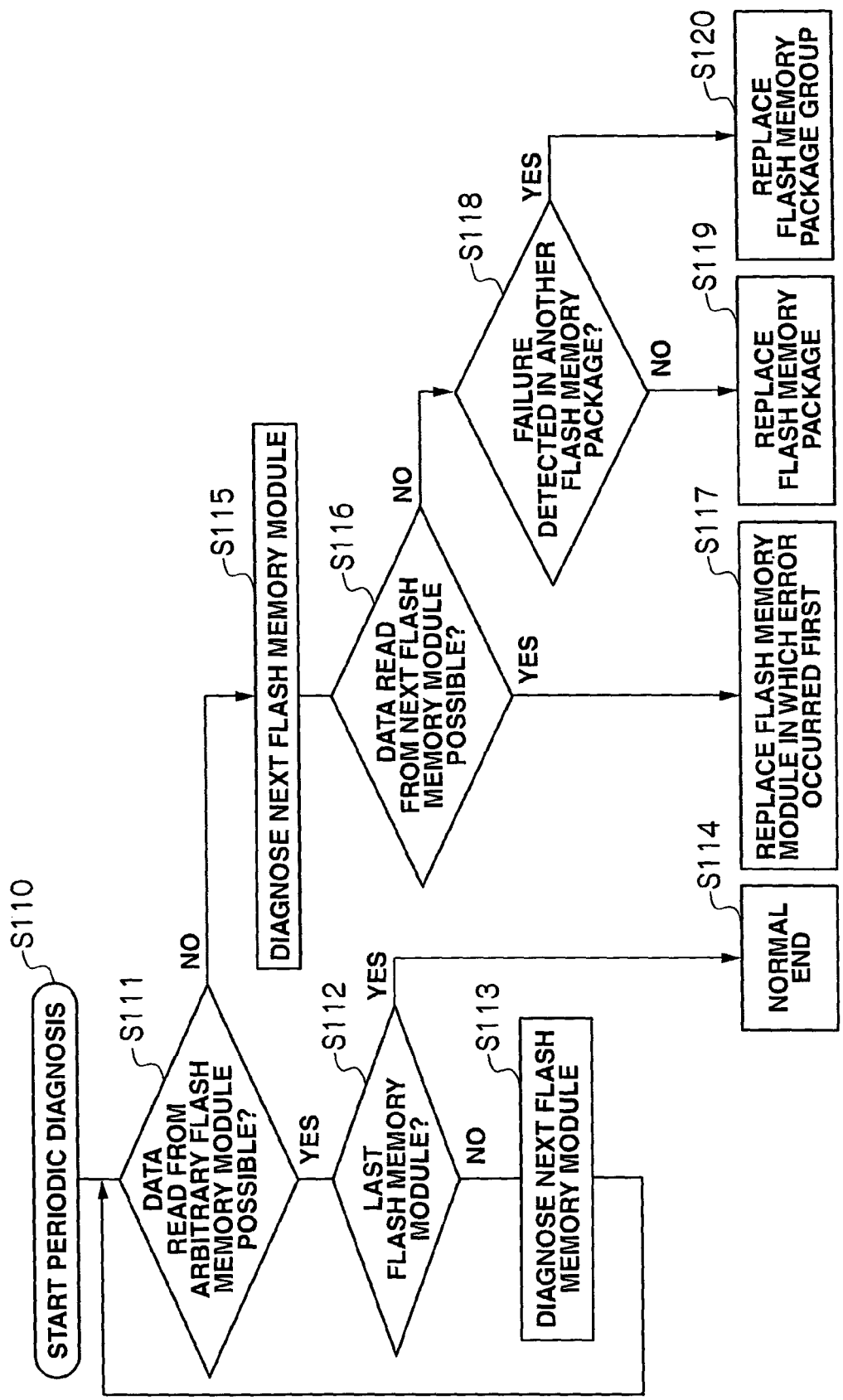
FIG. 20 is a flowchart illustrating periodic diagnosis processing according to the first embodiment.

Specifically as shown in FIG. 20, when the time for the periodic diagnosis as set by the administrator in step S4 comes, the periodic diagnosis program starts to operate and the microprocessor 707 for the disk adapter 706 starts the periodic diagnosis processing on an ECC group basis (S110).

Figure 21:
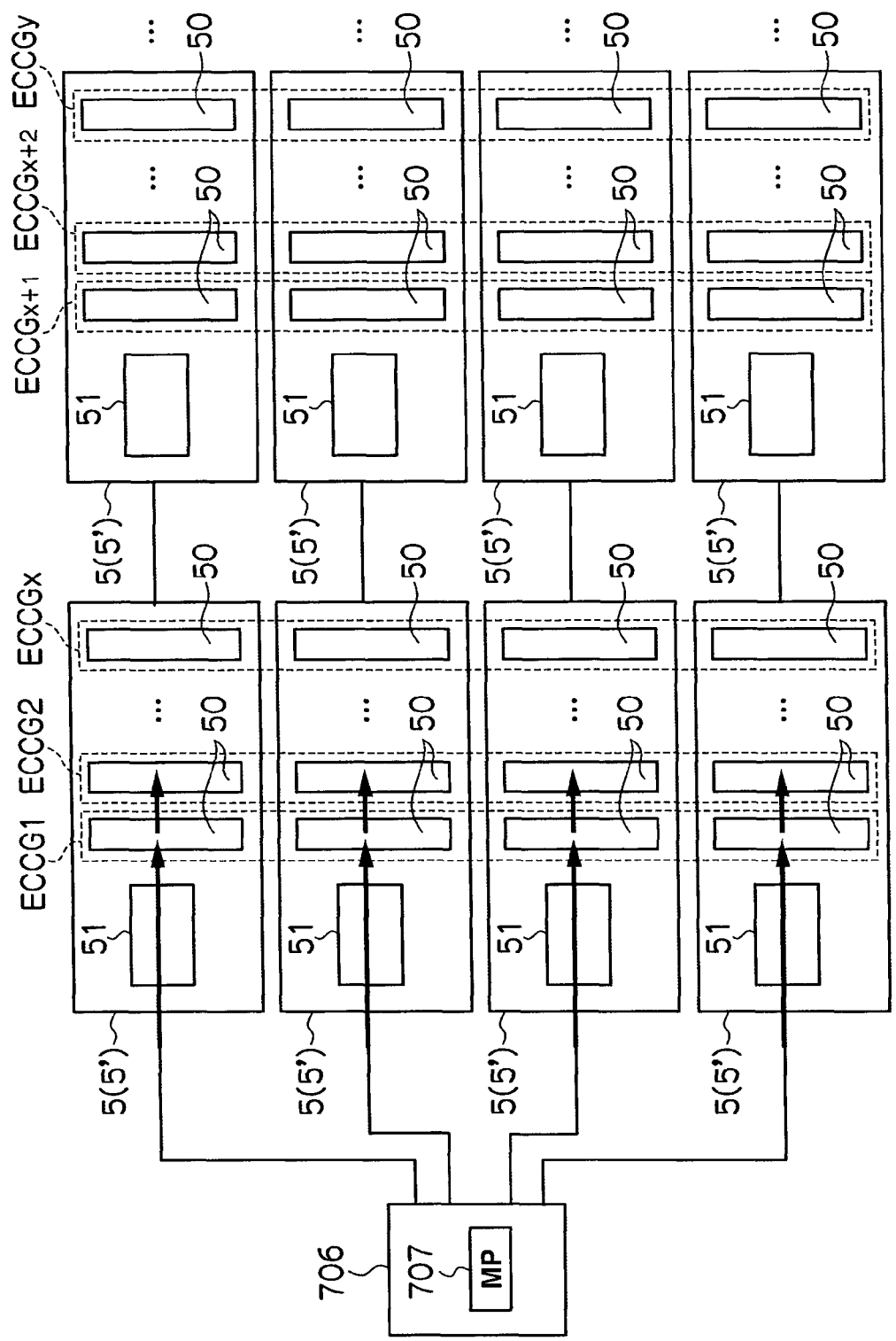
FIG. 21 is an explanatory diagram illustrating periodic diagnosis processing according to the first embodiment.

In the first embodiment as shown in FIG. 21, the microprocessor 707 selects arbitrary flash memory packages 5 that have flash memory modules 50 belonging to the same ECC group. The flash memory modules 50 belonging to the same ECC group are composed of four flash memory packages 5, so the periodic diagnosis processing will be executed for the four flash memory packages 5 in parallel on an ECC group basis.

The microprocessor 707 judges whether data can be read from a plurality of flash memory chips 500 in an arbitrary flash memory module 50 belonging to the same ECC group (S111).

The microprocessor 707 then actually reads the data from the arbitrary flash memory module 50 (from S80 to S100).

Incidentally, the data read processing was described above in steps S80 to S100, so its detailed description is omitted here.

If the microprocessor 707 determines that the data can be read from each flash memory unit 500 of the arbitrary flash memory module 50 (S111: YES), the microprocessor 707 judges whether it is the last flash memory module 50 to be subject to the periodic diagnosis (S112).

If the microprocessor 707 determines that it is the last flash memory module 50 (S112: YES), the microprocessor 707 concludes that the flash memory package group 56A is in proper working condition and then terminates the periodic diagnosis processing (S114).

If the microprocessor 707 determines that it is not the last flash memory module 50 (S112: NO), the microprocessor 707 executes step S111 again to diagnose the next flash memory module 50 (S113).

On the other hand, if the microprocessor 707 determines that data cannot be read from the respective flash memory chips 500 of the arbitrary flash memory module 50 (S111: NO), it indicates that a failure has occurred in the first diagnosed flash memory module 50, and the microprocessor 707 then diagnoses the next arbitrarily selected flash memory module 50 (S115).

Then the microprocessor 707 judges, in the same manner as in the procedure in step S111, whether data can be read from the next flash memory module 50 or not (S116). In this case also, the microprocessor 707 actually reads data from that flash memory module 50 (from S80 to S100).

If the microprocessor 707 determines that data can be read from the respective flash memory chips 500 of the next flash memory module 50 (S116: YES), it indicates that the then diagnosed flash memory module 50 is normally operating. So, only the flash memory module 50 in which the failure occurred is replaced (S117).

Figure 22:
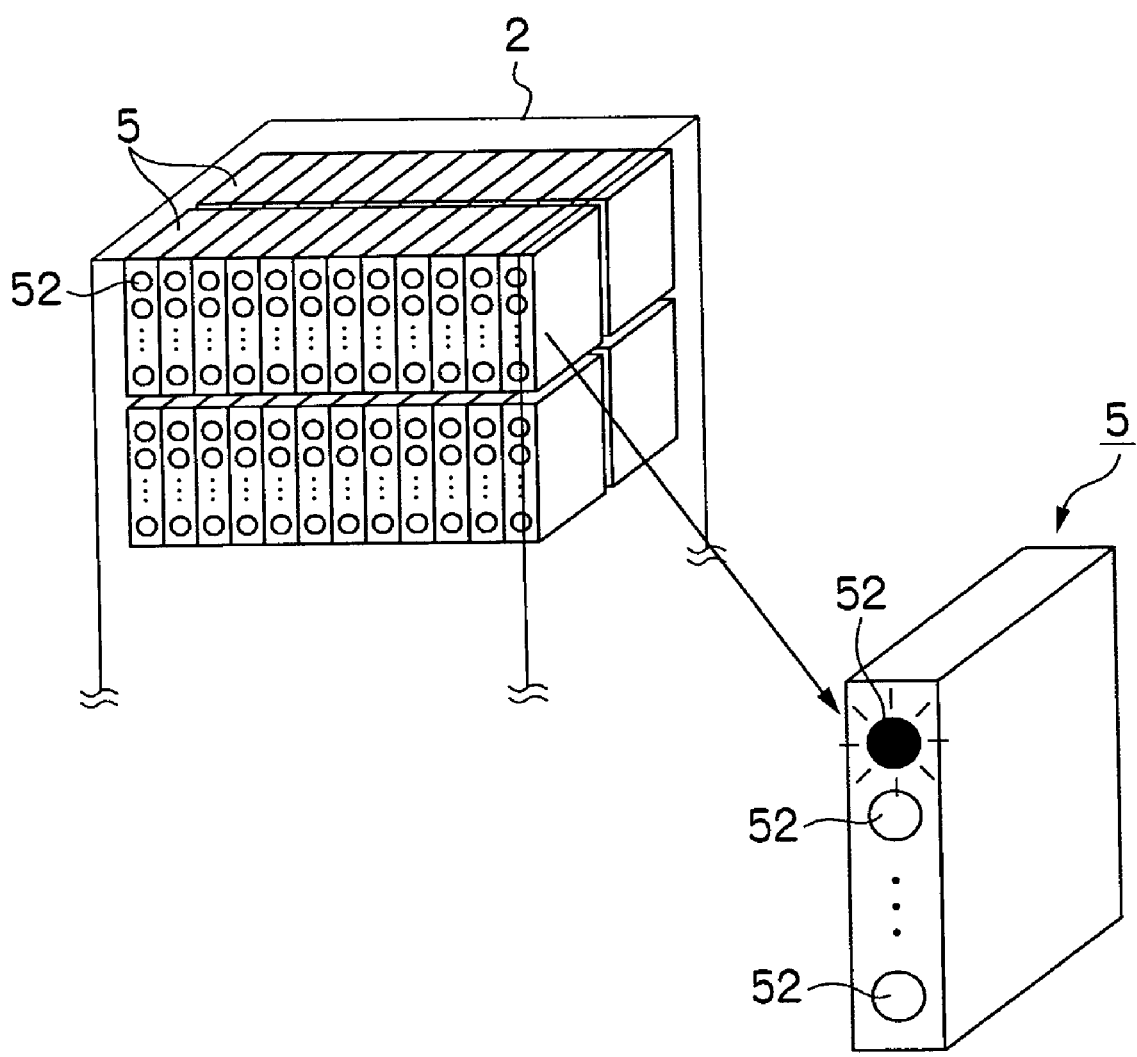
FIG. 22 is a schematic perspective view of the exterior appearance of the storage controller when a failure occurs in a flash memory module according to the first embodiment.

For example, the processor 511 for the flash memory package 5 commands the LED control unit 517 to turn on an LED 52 corresponding to the first diagnosed flash memory module 50. Then, the corresponding LED 52 lights up. As a result, the failure location can be visually recognized by the administrator from outside as shown in FIG. 22.

Also, the specific failure location can be visually recognized by the administrator by outputting the address conversion table 704, which has been processed, for example, to indicate the failure location with the mark "M," on the management screen 120 of the management terminal 12 as shown in FIG. 23.

On the other hand, if the microprocessor 707 determines that data cannot be read from the respective flash memory chips 500 of the next flash memory module 50 (S116: NO), the microprocessor 707 can conclude that a failure has occurred in the arbitrarily selected flash memory package 5 itself.

Next, the microprocessor 707 judges whether a failure can be detected in another flash memory package 5 or not (S118). Specifically, the microprocessor 707 also selects an arbitrary flash memory module 50 in another flash memory package 5 and executes the data read processing (from S80 to S100).

If the microprocessor 707 determines that no failure can be detected in the other flash memory package 5 (S118: NO), only the flash memory package 5 in which a failure has occurred is replaced (S119).

If the microprocessor 707 determines that a failure is also detected in the other flash memory package 5 (S118: YES), the flash memory package group 56A is replaced (S120).

Since the microprocessor 707 for the disk adapter 706 can promptly find a failure by conducting periodic diagnosis on an ECC group basis, there is no danger in having the power source for the flash memory modules 50 normally off.

(1-8) Failure Management Screen

An example of the screen display on the management screen 120 for notifying the administrator of the occurrence of a failure will be described below for the case where the failure occurs in a flash memory module 50 in the flash memory package group 56A during the periodic diagnosis processing described above or normal data read/write processing.

Figure 24:
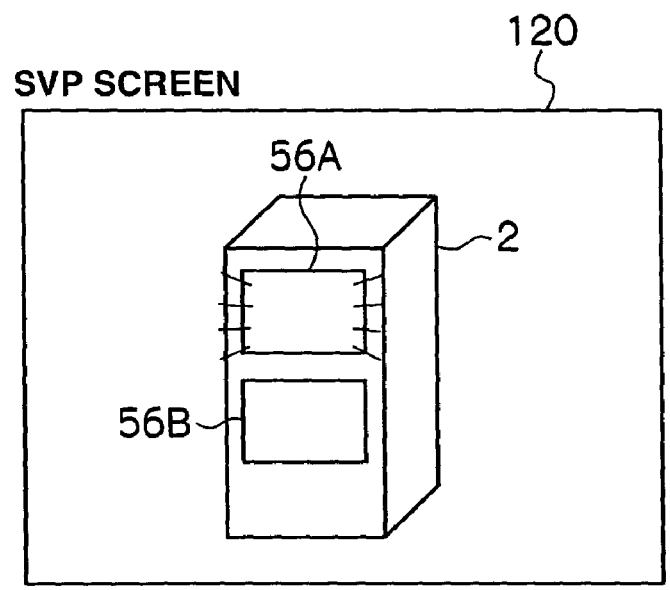
FIG. 24 is the management screen when a failure has occurred in the flash memory module according to the first embodiment.

If a failure occurs in a flash memory module 50 belonging to a certain ECC group, as shown in FIG. 24, a conceptual diagram of the storage controller 2 in which the flash memory package group 56A part blinks on and off is first displayed on the management screen 120.

Figure 25:
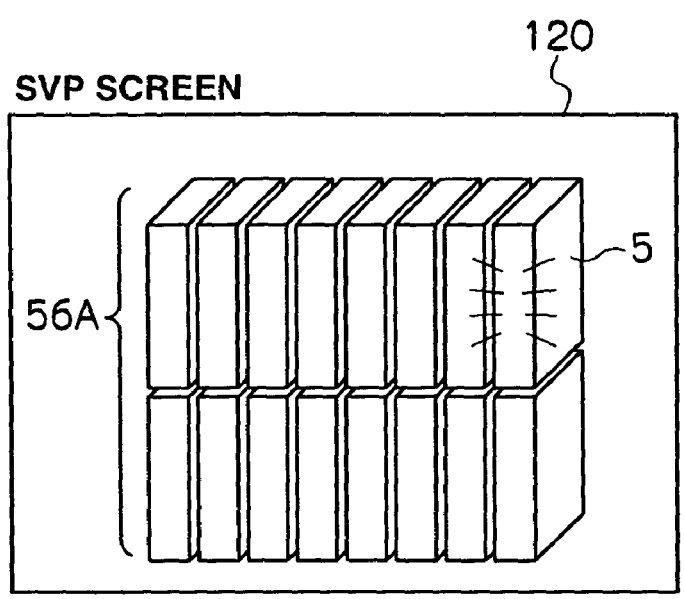
FIG. 25 is the management screen when a failure has occurred in the flash memory module according to the first embodiment.

If the administrator clicks the blinking flash memory package group 56A part, an enlarged view of a plurality of flash memory packages 5 is displayed on the management screen 120 as shown in FIG. 25. In this display, the flash memory package 5 part where a failure has occurred blinks on and off.

Figure 26:
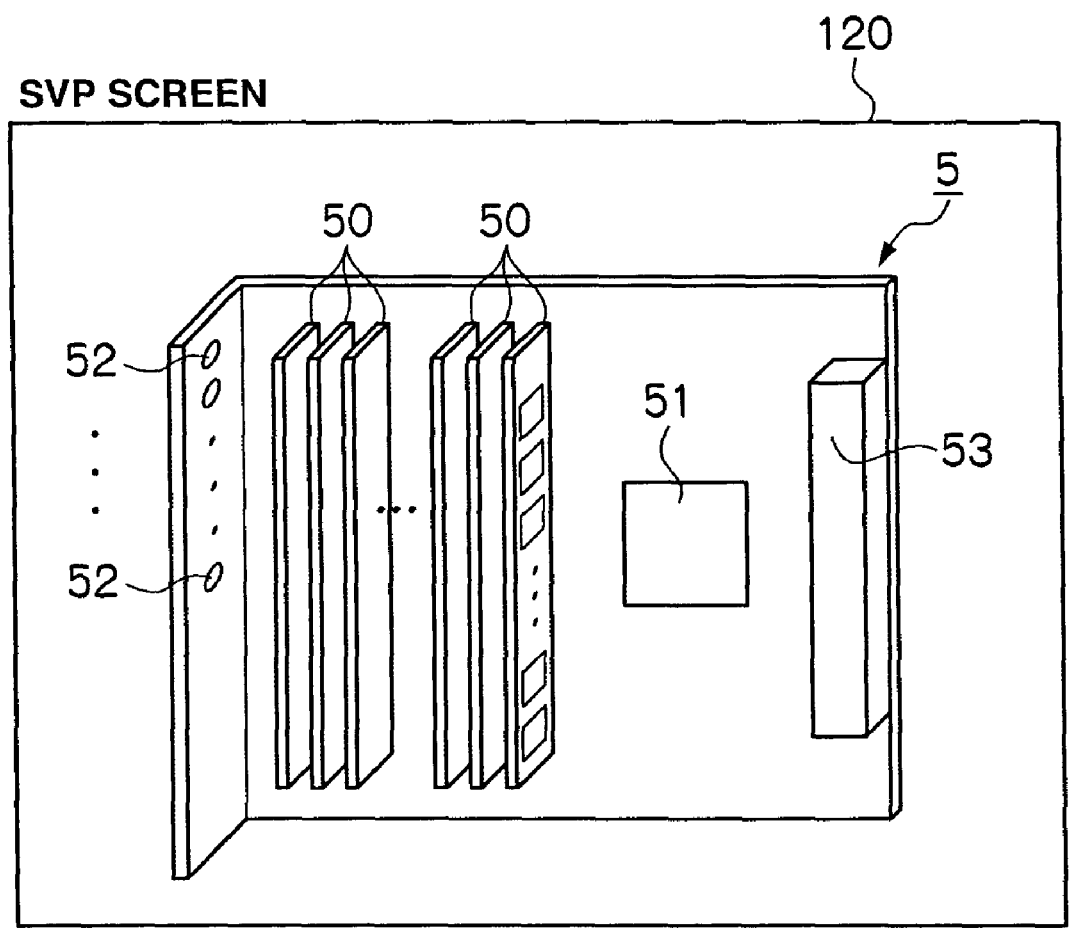
FIG. 26 is the management screen when a failure has occurred in the flash memory module according to the first embodiment.

If the administrator then clicks this blinking flash memory package 5 part, an internal conceptual diagram of the flash memory package 5 is displayed on the management screen 120 as shown in FIG. 26, and the flash memory module 50 part where the failure has occurred blinks on and off.

As described above, it is possible to visually notify the administrator of a flash memory module 50 in which a failure has occurred. The notified administrator can replace the flash memory module 50, in which the failure has occurred, without fail by checking the above-described display screen and the lighted LED 52 on the actual device. Incidentally, the case where a failure occurs in a flash memory module 50 has been described, but the administrator can be visually notified of a failure also in the case where a failure occurs in the entire flash memory package 5.

(1-9) Advantageous Effects of First Embodiment

Since a storage system equipped with flash memory, which is a nonvolatile medium with a fast power-on-and-off speed, is used to control the power source for the flash memory that is turned on only when necessary according to the first embodiment, a storage system with large capacity and low power consumption can be realized.

(2) Second Embodiment (2-1) External Configuration of Storage System

Reference Numeral 100 represents a storage system according to a second embodiment. This storage system 100 includes a storage controller 2' having a data input/output function that controls data input and output. Incidentally, the configuration of the storage system 100 according to the second embodiment is the same as that shown in FIG. 5, so its detailed description has been omitted.

The storage controller 2' contains, in a rectangular parallelepiped rack frame 3', a plurality of cooling fan units 4, flash memory packages 5', hard disk drive units 6, logical substrates 7, and power source units 8. Incidentally, the reference numerals used in the second embodiment that are the same as those explained in the first embodiment represent the same components, so their description has been omitted here.

Figure 27:
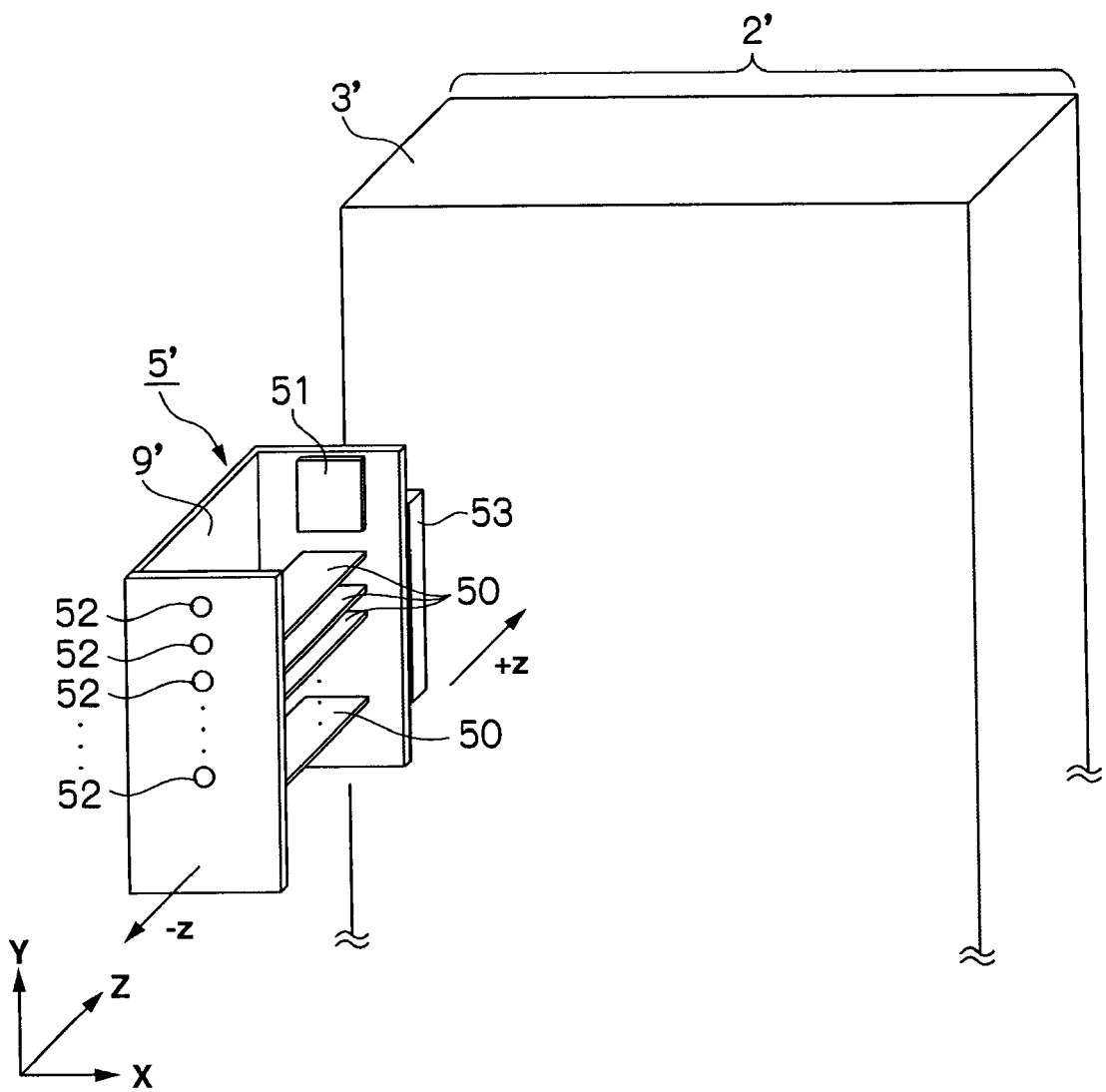
FIG. 27 is a schematic perspective view of a flash memory package according to a second embodiment.

As shown in FIG. 27, the flash memory package 5' is configured so that flash memory modules 50, each containing a plurality of flash memory chips (hereinafter referred to as the "flash memory") 500, are mounted on a wiring substrate 9' of predetermined size and can be freely replaced.

As shown in FIG. 3, as many LEDs (Light Emitting Diodes) 52 as there are flash memory modules 50 mounted are placed on the front-end side of the flash memory package 5'. Also, the front-end side of the flash memory package 5' is formed as a door panel that can be opened.

A connector 53 is provided on the rear-end side of the flash memory package 5'. The connector 53 is made to engage with a connector 11 on a back board 10 located in the rack frame 3 so that the flash memory package 5' is physically and electrically connected with the back board 10.

In the second embodiment, the flash memory modules 50 are mounted on the wiring substrate 9' in such a manner that the flash memory modules 50 can be replaced by inserting them into the wiring substrate 9' in a direction (−Z direction in FIG. 27) the opposite of the direction (Z direction in FIG. 27) of insertion of the flash memory package 5' into the rack frame 3.

Because of the above-described configuration, the flash memory module 50 where a failure has occurred alone can be pulled out of the flash memory package 5' merely by opening the front-end side of the flash memory package 5'. Therefore, it is easy to replace a faulty flash memory module 50.

(2-2) Advantageous Effects of Second Embodiment

Since a storage system equipped with flash memory, which is nonvolatile medium with a fast power-on-and-off speed, is used to control the power source for the flash memory to be turned on only when necessary according to the second embodiment, a storage system with large capacity and low power consumption can be realized.

(3) Other Embodiments

According to the first and second embodiments, flash memory modules 50 that are arranged in parallel and belong to different flash memory packages 5 constitute one ECC group. However, a plurality of flash memory modules 50 in the same flash memory package 5 may constitute one ECC group. Also, flash memory modules 50 that are arranged in series and belong to different flash memory packages 5 may constitute one ECC group.

The flash memory was described as nonvolatile memory in the first and second embodiments. However, the type of nonvolatile memory is not limited to the flash memory described in the first and second embodiments, so long as nonvolatile semiconductor memory is used Similarly, the flash memory package 5 was described as a nonvolatile memory package, and the flash memory module 50 was described as a nonvolatile memory module. However, the type of nonvolatile memory package or module is not limited to the flash memory package 5 or the flash memory module 50 described in the first and second embodiment, so long as a package or a module composed of nonvolatile semiconductor memory is used.

The microprocessor 707 for the disk adapter 706, which is the disk control unit, has been described as controlling data input to and output from the flash memory package 5. However, the microprocessor 701 for the channel adapter 700 may control the data input and output.

The case where a failure occurs during the periodic diagnosis processing was explained by referring to FIGS. 22 and 23. However, the administrator can also visually recognize the occurrence of a failure in the same manner during normal operation of the storage system 1.

The present invention can be widely applied in a storage system having one or more storage controllers and in other forms of storage systems.

What is claimed is:

1. A storage controller connected to a host computer, the storage controller comprising:
a plurality of nonvolatile memory modules having a plurality of nonvolatile memory chips for storing data from the host computer;
a nonvolatile memory control unit for controlling data input to and output from the host computer by controlling a power source for the nonvolatile memory modules;
wherein when reading or writing data from or to a designated nonvolatile memory module at a specified time in response to a data read/write request from the host computer, the nonvolatile memory control unit performs power-on control to turn on the power source for only the designated nonvolatile memory module;
a plurality of logical volumes formed in storage areas of a plurality of hard disk drives, that store data from the host computer; and
a plurality of nonvolatile memory packages composed of the plurality of nonvolatile memory modules;
wherein each of the nonvolatile memory packages includes the plurality of nonvolatile memory modules and the nonvolatile memory control unit;
wherein the same number of Error Correcting Code (ECC) groups are formed in a hard disk drive group composed of the plurality of hard disk drives as the number of ECC groups are formed in a nonvolatile memory package group composed of the plurality of nonvolatile memory packages;
wherein the data from the host computer is stored in a designated logical volume; and
wherein when the data stored in the designated logical volume is migrated to the nonvolatile memory module belonging to the ECC group that corresponds to the ECC group to which the designated logical volume belongs, power-on control is performed on an ECC group basis to turn on only the power source for the designated nonvolatile memory module.

2. The storage controller according to claim 1, wherein each of the nonvolatile memory packages has a management table for managing only the plurality of nonvolatile memory modules and the nonvolatile memory control unit that constitute that nonvolatile memory package;
wherein the nonvolatile control unit for the nonvolatile memory package reads the management table and judges whether or not the data read/write request is a request made to a nonvolatile memory module in its own nonvolatile memory package; and
if the data read/write request is made to a nonvolatile memory module in its own nonvolatile memory package, power-on control is performed based on the management table to turn on the power source for only the designated nonvolatile memory module; and
if the data read/write request is not made to a nonvolatile memory module in its own nonvolatile memory package, the data read/write request is sent to another nonvolatile memory package.

3. The storage controller according to claim 2, wherein after the data from the host computer is stored in the designated nonvolatile memory module for which the power-on control was performed to store the data from the host computer, the nonvolatile memory control unit performs power-off control to turn off the power source for the designated nonvolatile memory module.

4. The storage controller according to claim 3, further comprising a disk control unit for controlling data input to and output from the nonvolatile memory modules;
wherein the disk control unit and the nonvolatile memory package group are connected to each other;
wherein the disk control unit judges whether or not data stored in the nonvolatile memory module arbitrarily selected in the nonvolatile memory package selected first can be read at specified time;
if the data stored in the nonvolatile memory module cannot be read, the disk control unit judges whether or not data stored in the nonvolatile memory module selected next can be read; and
if the data stored in the next selected nonvolatile memory module cannot be read, the disk control unit judges whether or not data stored in the nonvolatile memory module arbitrarily selected in another nonvolatile memory package can be read.

5. The storage controller according to claim 4, wherein if the data stored in the next selected nonvolatile memory module can be read, the disk control unit replaces the nonvolatile memory module arbitrarily selected in the first selected nonvolatile memory package;
if the data stored in the arbitrary nonvolatile memory module in another nonvolatile memory package can be read, the disk control unit replaces the first selected nonvolatile memory package; and
if the data stored in the arbitrary nonvolatile memory module in another nonvolatile memory package cannot be read, the disk control unit replaces the nonvolatile memory package group.

6. A method for controlling a storage controller connected to a host computer, the storage controller including:
a plurality of nonvolatile memory modules having a plurality of nonvolatile memory chips for storing data from the host computer;
a nonvolatile memory control unit for controlling data input to and output from the host computer by controlling a power source for the nonvolatile memory modules;
wherein the storage controller controlling method comprises the step executed by the nonvolatile memory control unit of performing power-on control to turn on the power source only for the designated nonvolatile memory module when reading or writing data from or to a designated nonvolatile memory module at a specified time in response to a data read/write request from the host computer;
a plurality of logical volumes formed in storage areas of a plurality of hard disk drives, that store data from the host computer; and
a plurality of nonvolatile memory packages composed of the plurality of nonvolatile memory modules;
wherein each of the nonvolatile memory packages includes the plurality of nonvolatile memory modules and the nonvolatile memory control unit;
wherein the storage controller controlling method further comprises the steps of:
forming the same number of Error Correcting Code (ECC) groups in a hard disk drive group composed of the plurality of hard disk drives as the number of ECC groups are formed in a nonvolatile memory package group composed of the plurality of nonvolatile memory packages;
storing the data from the host computer in a designated logical volume; and
performing power-on control on an ECC group basis to turn on the power source for only the designated nonvolatile memory module when the data stored in the designated logical volume is migrated to the nonvolatile memory module belonging to the ECC group that corresponds to the ECC group to which the designated logical volume belongs.

7. The storage controller controlling method according to claim 6, wherein each of the nonvolatile memory packages has a management table for managing only the plurality of nonvolatile memory modules and the nonvolatile memory control unit that constitute that nonvolatile memory package;

wherein the storage controller controlling method further comprises the steps executed by the nonvolatile control unit for the nonvolatile memory package of:

reading the management table and judging whether or not the data read/write request is a request made to a nonvolatile memory module in its own nonvolatile memory package;

if the data read/write request is made to a nonvolatile memory module in its own nonvolatile memory package, performing power-on control based on the management table to turn on the power source for only the designated nonvolatile memory module; and if the data read/write request is not made to a nonvolatile memory module in its own nonvolatile memory package, sending the data read/write request to another nonvolatile memory package.

8. The storage controller controlling method according to claim 7, further comprising a step executed by the nonvolatile memory control unit of performing power-off control to turn off the power source for the designated nonvolatile memory module after the data from the host computer is stored in the designated nonvolatile memory module for which power-on control was performed to store the data from the host computer.

9. The storage controller controlling method according to claim 8, wherein the storage controller further includes a disk control unit for controlling data input to and output from the nonvolatile memory modules;

wherein the disk control unit and the nonvolatile memory package group are connected to each other;

wherein the storage controller controlling method further comprises steps executed by the disk control unit of:

judging whether or not data stored in the nonvolatile memory module arbitrarily selected in the nonvolatile memory package selected first can be read at the specified time;

if the data stored in the nonvolatile memory module cannot be read, judging whether or not data stored in the nonvolatile memory module selected next can be read; and if the data stored in the next selected nonvolatile memory module cannot be read, judging whether or not data stored in a nonvolatile memory module arbitrarily selected in another nonvolatile memory package can be read.

* * * * *